United States Patent
Chainer et al.

(10) Patent No.: US 11,009,926 B2
(45) Date of Patent: *May 18, 2021

(54) SYSTEM LEVEL MODEL FOR PUMPED TWO-PHASE COOLING SYSTEMS

(71) Applicant: International Business Machines Corporation, Armonk, NY (US)

(72) Inventors: Timothy Joseph Chainer, Putnam Valley, NY (US); Leitao Chen, Houston, TX (US); Pritish Ranjan Parida, Fishkill, NY (US); Mark Delorman Schultz, Ossining, NY (US); Fanghao Yang, Somerset, NJ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/775,885

(22) Filed: Jan. 29, 2020

(65) Prior Publication Data
US 2020/0166975 A1 May 28, 2020

Related U.S. Application Data

(63) Continuation of application No. 15/276,379, filed on Sep. 26, 2016, now Pat. No. 10,585,462.

(51) Int. Cl.
*G06F 1/20* (2006.01)
*F24F 11/62* (2018.01)

(52) U.S. Cl.
CPC .............. *G06F 1/20* (2013.01); *F24F 11/62* (2018.01); *G06F 2200/201* (2013.01)

(58) Field of Classification Search
CPC ....... G06F 1/20; G06F 2200/201; F24F 11/62
(Continued)

(56) References Cited

U.S. PATENT DOCUMENTS 4,965,743 A 10/1990 Malin et al.
5,050,114 A 9/1991 Lee
(Continued)

FOREIGN PATENT DOCUMENTS

WO 2017120284 A1 7/2017
WO WO-2017120284 A1 * 7/2017 ............... H05K 7/00

OTHER PUBLICATIONS

Chen, et al., "Enthalpy-based System-Model for Pumped Two-phase Cooling Systems," Last Accessed: Aug. 30, 2016, 8 pages.
(Continued)

*Primary Examiner* — Michael J Brown
(74) *Attorney, Agent, or Firm* — Amin, Turocy & Watson, LLP

(57) ABSTRACT

Techniques are provided for system level modeling of two-phase cooling systems. In one example, a computer-implemented method comprises determining, by a system operatively coupled to a processor, respective sets of steady state values for parameters at inlet-outlet junctions using a system model, wherein the determining is based on first user input specifying a cooling system design comprising a plurality of part objects, wherein adjacent part objects in a flow direction are connected at the inlet-outlet junctions. The computer-implemented method can also comprise generating, by the system, a graphical display that depicts the respective sets of parameter values at the inlet-outlet junctions.

20 Claims, 12 Drawing Sheets

(58) Field of Classification Search
USPC .......................................................... 700/300
See application file for complete search history.

(56) References Cited

U.S. PATENT DOCUMENTS

| | | | |
|---|---|---|---|
| 6,885,982 | B2 | 4/2005 | Harris et al. |
| 8,024,936 | B2 | 9/2011 | Storm et al. |
| 8,571,689 | B2 | 10/2013 | Macharia et al. |
| 8,619,425 | B2 | 12/2013 | Campbell et al. |
| 9,110,476 | B2 | 8/2015 | David et al. |
| 9,496,197 | B1 | 11/2016 | Micovic et al. |
| 10,199,309 | B2 | 2/2019 | Chainer et al. |
| 10,585,462 | B2 * | 3/2020 | Chainer .................... G06F 1/20 |
| 2005/0039888 | A1 | 2/2005 | Pfahnl et al. |
| 2007/0174195 | A1 * | 7/2007 | Akiyama ............ H04M 1/7253 |
| | | | 705/50 |
| 2011/0315353 | A1 | 12/2011 | Campbell et al. |
| 2011/0317376 | A1 | 12/2011 | Chen et al. |
| 2015/0359133 | A1 | 12/2015 | Joshi et al. |
| 2016/0120071 | A1 | 4/2016 | Shedd et al. |
| 2016/0285145 | A1 | 9/2016 | Flahaut et al. |
| 2018/0031290 | A1 | 2/2018 | Ho et al. |
| 2018/0052499 | A1 | 2/2018 | Bose et al. |
| 2018/0323132 | A1 | 11/2018 | Chainer et al. |

OTHER PUBLICATIONS

Chen, et al., "Enthalpy-based System-Model for Pumped Two-phase Cooling Systems," IEEE ITherm 2016, Paper # ITherm2016—443, Jun. 2, 2016, 12 pages.

Galindo, et al., "Study of a Volumetric Expander Suitable for Waste Heat Recovery From an Automotive IC Engine Using an ORC With Ethanol," Paper ID: 85, p. 1, Last Accessed: Aug. 30, 2016, 17 pages.

Skoglund, et al., "Dynamic object-oriented heat exchanger models for simulation of fluid property transitions," International Journal of Heat and Mass Transfer 49 (2006), pp. 2291-2303.

Sridhar, et al., "Thermal Design of a Hierarchical Radially Expanding Cavity for Two-Phase Cooling of Integrated Circuits," Proceedings of the ASME 2015 International Technical Conference and Exhibition & on Packaging and Integration of Electronic and Photonic Microsystems InterPACK 2015 Jul. 6-9, 2015, San Francisco, USA, 10 pages.

List of IBM Patents or Applications Treated as Related.

Non-Final Office Action received for U.S. Appl. No. 15/276,379 dated May 6, 2019, 67 pages.

* cited by examiner

US 11,009,926 B2

1

SYSTEM LEVEL MODEL FOR PUMPED TWO-PHASE COOLING SYSTEMS

STATEMENT REGARDING FEDERALLY SPONSORED RESEARCH OR DEVELOPMENT

This invention was made with government support under contract number FA8650-14-C-7466 awarded by U.S. Defense Advanced Research Projects Agency. The government has certain rights to this invention.

BACKGROUND

The subject disclosure relates to system level modeling of two-phase cooling systems.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatus and/or computer program products that facilitate system level modeling of two-phase cooling systems are described.

According to an embodiment, a system is provided. The system comprises a memory that stores computer executable components; and a processor that executes the computer executable components stored in the memory. The computer executable components can comprise a cooling system design component that receives first user input specifying a cooling system design comprising a plurality of part objects, wherein adjacent part objects in a flow direction are connected at inlet-outlet junctions. The computer executable components can also comprise a system solver component that determines respective sets of steady state values for parameters at the inlet-outlet junctions using a system model, and generates a graphical display that depicts the respective sets of parameter values at the inlet-outlet junctions.

In another embodiment a computer-implemented method is provided. The computer-implemented method can comprise determining, by a system operatively coupled to a processor, respective sets of steady state values for parameters at inlet-outlet junctions using a system model, wherein the determining is based on first user input specifying a cooling system design comprising a plurality of part objects, wherein adjacent part objects in a flow direction are connected at the inlet-outlet junctions. The computer-implemented method can also comprise generating, by the system, a graphical display that depicts the respective sets of parameter values at the inlet-outlet junctions.

In another embodiment, a computer program product for cooling system design modeling is provided. The computer program product can comprise a computer readable storage medium having program instructions embodied therewith. The program instructions can be executable to receive first user input specifying a cooling system design comprising a plurality of part objects, wherein adjacent part objects in a flow direction are connected at inlet-outlet junctions. The program instructions can also be executable to determine respective sets of steady state values for parameters at the inlet-outlet junctions using a system model. The program instructions can also be executable to generate a graphical display that depicts the respective sets of parameter values at the inlet-outlet junctions.

DETAILED DESCRIPTION

Figure 1:
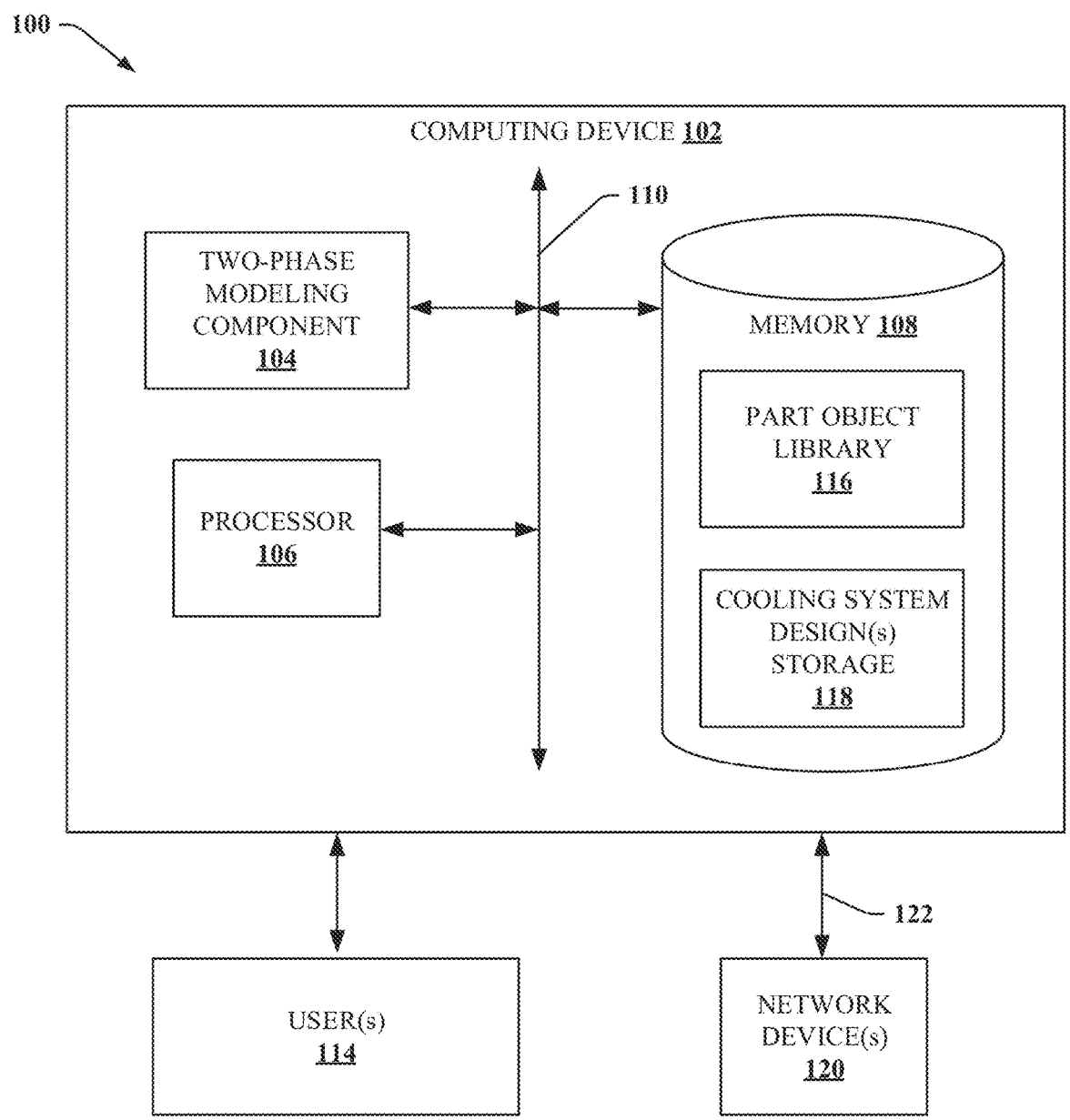
FIG. 1 illustrates a block diagram of an example, non-limiting system that facilitates automated system level modeling of a multitude of configurations of two-phase cooling systems and automatically generating recommendations for alternate parts that can improve coefficient of performance (COP) of a cooling system design in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident; however in various cases, that the one or more embodiments can be practiced without these specific details.

The significance of cooling technologies has increasingly grown in the information technology (IT) industry. The demand to increase system performance has driven the development of three-dimensional (3D) chip stacking, which reduces the distance of chip communications and increases bandwidth. However, the 3D stacking structure can cause dramatic rises of both volumetric heat generation and heat flux in the stack, which can be, for example, over 1 kW/cm$^3$ and 1 kW/cm$^2$ (where kW is kilowatt and cm is centimeter), respectively. In addition, with the rapid growth of the IT sector, energy consumption is also skyrocketing. Among the total energy consumed by IT devices, the energy for cooling is a major contributor. Recent studies for data centers have shown that power usage accounts for 2% of total United States power consumption, of which 25%-30% is utilized by cooling.

Two-phase liquid cooling, which combines excellent thermal performance and energy efficiency, offers a solution to next-generation cooling technology in the IT industry. In two-phase cooling, heat is absorbed during the change in phase of the coolant from liquid to vapor, which can sustain large heat transfer coefficients. As a result, the flow rate of the refrigerant in two-phase cooling systems can be lowered, thus decreasing pumping power consumption. However, the changes in the state of the coolant between liquid phase and vapor phase can add complexity to the modeling of a two-phase cooling system due to the physics involved.

To address the challenges of cooling system design as described herein, one or more exemplary embodiments of the invention provide system level modeling frameworks that allow for rapid configuration/re-configuration of cooling system design and accurate modeling of pressure (P), temperature (T), and vapor quality (x) values at various locations in the cooling system design, as well as coefficient of performance (COP) of the cooling system design. These frameworks can employ reusable part objects that can be automatically and efficiently selected and combined in one or more different configurations to form a cooling system design. Each part object can be customized and can be self-contained to calculate its own outputs variables based on its input variables using its own algorithm (e.g. numerical model), regardless of which other part object it is connected.

One goal of the two-phase cooling system level model can be to calculate the macroscopic variables, namely the pressure (P), temperature (T) and vapor quality (x), at any location in the cooling system. When operating a cooling system, the mass flow rate can be a controllable variable. Therefore, in the system level model, the mass flow rate can be assumed to be a known parameter used to calculate other unknowns. The same mass flow rate can be applied to every component in the system in some embodiments. The pressure drop ΔP, which provides a solution to P can be calculated; and T and x can also be computed. For some system parts such as a microchannel evaporator with complicated flow networks, determining momentum and energy can be computationally intensive. Therefore, higher-level abstractions in the form of correlations or characteristic curves based on experimental data can be employed to obtain the values of P, T, and x. Additionally, in some embodiments, a Reference Fluid Thermodynamic and Transport Properties (REFPROP) database can be used for computing various fluid intrinsic properties. The calculations of the thermodynamic and transport properties of the refrigerant can be very accurate due to the high-fidelity equations of state (EOS) in the REFPROP database.

One or more embodiments of the subject disclosure is directed to computer processing systems, computer-implemented methods, apparatus and/or computer program products that facilitate efficiently, effectively, and automatically (e.g., without direct human involvement) system level modeling of two-phase cooling systems and generating recommendation for alternate parts that can improve coefficient of performance (COP) of a cooling system design.

In order to facilitate system level modeling of two-phase cooling systems and generating recommendation for alternate parts that can improve coefficient of performance (COP) of a cooling system design, one or more embodiments described herein can include techniques involving iteratively determining the values of P, T, and x at inlet-outlet junctions of parts in a cooling system design, by traversing the cooling system design from a starting inlet-outlet junction in the flow direction of coolant employing initial values for P, T, and x and determining resulting values for P, T, and x at the starting inlet-outlet junction after the traversal, and repeating this process using the resulting values for P, T, and x as initial values for P, T, and x for the next iteration until the resulting values for P, T, and x are within a defined threshold of the initial values for P, T, and x (e.g. iterate until convergence is achieved) in order to determine steady state values of P, T, and x at inlet-outlet junctions of parts in a cooling system design. An inlet-outlet junction occurs where in outlet of a part object for flow of coolant out of the part object is connected to an inlet of another part object for flow of the coolant into the other part object.

The computer processing systems, computer-implemented methods, apparatus and/or computer program products can employ hardware and/or software to solve problems that are highly technical in nature (e.g., adapted to perform system level modeling of a multitude of configurations of two-phase cooling systems and generating recommendations for alternate parts that can improve coefficient of performance (COP) of a cooling system design) that are not abstract and that cannot be performed as a set of mental acts by a human. For example, a human, or even thousands of humans, cannot efficiently, accurately and effectively manually perform system level modeling of two-phase cooling systems and generating recommendations for alternate parts that can improve a coefficient of performance (COP) of a cooling system design in a rapid manner One or more embodiments of the subject computer processing systems, methods, apparatuses and/or computer program products can enable the automated system level modeling of a multitude of configurations of two-phase cooling systems and automatically generating recommendations for alternate parts that can improve coefficient of performance (COP) of a cooling system design in a highly accurate and efficient manner. By employing automated system level modeling of a multitude of configurations of two-phase cooling systems and automatically generating recommendations for alternate parts that can improve coefficient of performance (COP) of a cooling system design, in one or more embodiments, the processing time and/or accuracy associated with cooling system design can be substantially improved. Further, one or more embodiments of the subject techniques can facilitate improved performance of automated system level modeling of a multitude of configurations of two-phase cooling systems and automatically generating recommendations for alternate parts that can improve coefficient of performance (COP) of a cooling system design that provides for more efficient usage of design system processing and storage resources by reducing cooling system designs that do not improve coefficient of performance (COP) through recommendations of alternate parts to a user.

Definitions used herein are as follows:
a first parameter in Equation (8)
f friction factor
g gravitational acceleration constant, 9.8 meters (m)/second(s)$^2$
h enthalpy, Joules (J)/kilogram (kg)
hf heat flux, Watts (W)/m$^2$
n second parameter in Equation (8)
x vapor quality
q applied heat
P pressure, pascal (Pa)
z the length in the flow direction, m
C the C value for Lockhart-Martinelli model
D hydrodynamic diameter, m
H height, m
G mass flux, kg/(m$^2$s)
T temperature, Kelvin (K)
$X_{tt}$ Martinelli parameter
α void fraction
ρ density (kg/m$^3$)
θ angle (radian)
φ amplifier
μ dynamic viscosity, pascel-second (Pa-s)
amb ambient
fr frictional force
g gravitational force
i index number for nodes during discretization
in inlet
out outlet
l liquid
mo momentum change
lc liquid column
r reservoir
v vapor
sat saturation
I index number for segments during discretization FIG. 1 illustrates a block diagram of an example, non-limiting system 100 that facilitates automated system level modeling of a multitude of configurations of two-phase cooling systems and automatically generating recommendations for alternate parts that can improve coefficient of performance (COP) of a cooling system design in accordance with one or more embodiments described herein. Aspects of systems (e.g., system 100 and the like), apparatuses or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. Repetitive description of like elements employed in one or more embodiments described herein is omitted for sake of brevity.

As shown in FIG. 1, the system 100 can include a computing device 102, one or more networks 122 and/or one or more network devices 120. In some embodiments, the system 100 can also include or receive input from one or more users 114 that can interact with computing device 102. The computing device 102 can include two-phase modeling component 104 that can facilitate automated system level modeling of a multitude of configurations of two-phase cooling systems and automatically generating recommendations for alternate parts that can improve coefficient of performance (COP) of a cooling system design. The computing device 102 can also include or otherwise be associated with at least one included memory 108 that stores computer executable components (e.g., computer executable components can include, but are not limited to, the two-phase modeling component 104 and associated components, part object library 116, and cooling system design(s) storage 118). The computing device 102 can also include or otherwise be associated with at least one processor 106 that executes the computer executable components stored in the memory 108. The computing device 102 can further include a system bus 110 that can couple the various components including, but not limited to, the two-phase modeling component 104, memory 108, and/or processor 106.

Computing device 102 and/or network device 120 can be any computing device that can be communicatively coupled to a network 122, non-limiting examples of which can include a server computer, a computer, a mobile computer, a mainframe computer, a wearable computer, a network storage device, a communication device, a web server device, a network switching device, a network routing device, a gateway device, a network hub device, a network bridge device, a control system, or any other suitable computing device. It is to be appreciated that computing device 102 and/or network device 120 can be equipped with communication components (not shown) that enable communication between computing device 102 and/or network device 120 over one or more networks 112. Moreover, computing device 102 and/or network device 120 can include one or more user interfaces (e.g., a web browser or application), that can receive and present displays and content generated locally or remotely to users 114.

The various components (e.g., two-phase modeling component 104, memory 108, processor 106, computing device 102, network device 120, and/or other components) of system 100 can be connected either directly or via one or more networks 122. Such networks 122 can include wired and wireless networks, including, but not limited to, a cellular network, a wide area network (WAN) (e.g., the Internet), or a local area network (LAN), non-limiting examples of which include cellular, WAN, wireless fidelity (Wi-Fi), Wi-Max, WLAN, radio communication, microwave communication, satellite communication, optical communication, sonic communication, or any other suitable communication technology.

Figure 2:
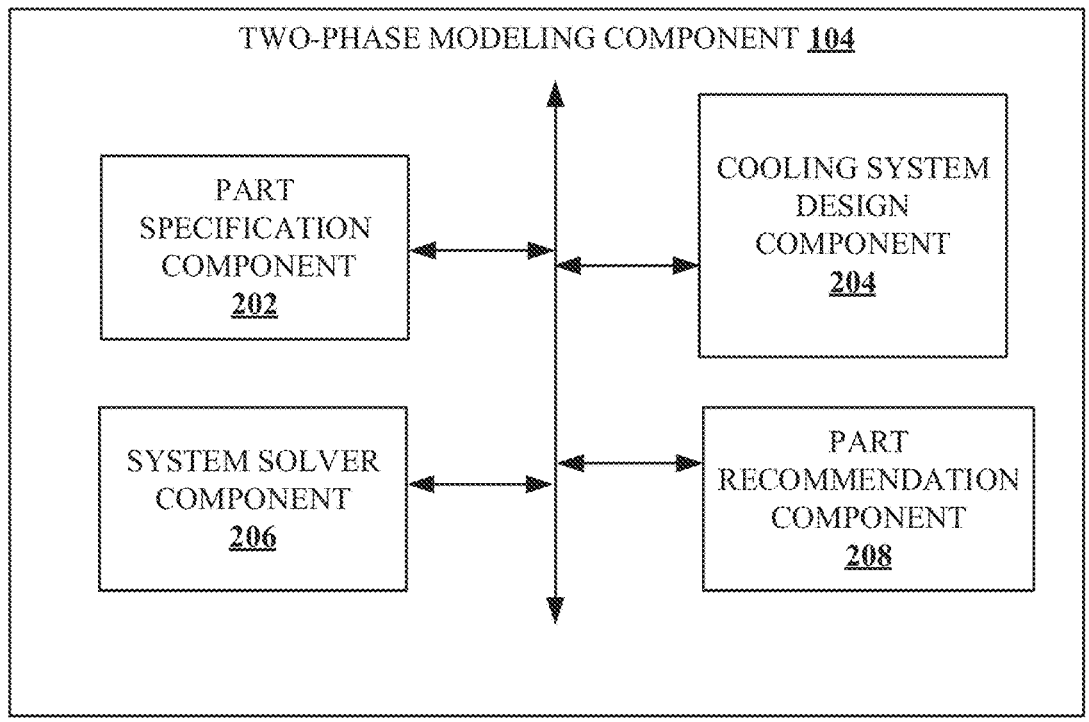
FIG. 2 illustrates a block diagram of an example, non-limiting two-phase modeling component in accordance with one or more embodiments described herein.

FIG. 2 illustrates a block diagram of an example, non-limiting two-phase modeling component 104 in accordance with one or more embodiments described herein. Two-phase modeling component 104 can facilitate automated system level modeling of a multitude of configurations of two-phase cooling systems and automatically generating recommendations for alternate parts that can improve coefficient of performance (COP) of a cooling system design. COP can be defined as the amount of heat (unit: watts) transferred from the heat source to the outdoor ambient per unit of cooling power (unit: watts). Repetitive description of like elements employed in other embodiments described herein is omitted for sake of brevity.

Two-phase modeling component 104 can include part specification component 202 that can automatically and/or manually obtain or receive part objects which provide specifications of parts (e.g. reservoir, pump, filter, micro-evaporator, cold plate, condenser, pipe, tube, flow meter, pre-heater, or any other suitable part) of a cooling system. Two-phase modeling component 104 can also include cooling system design component 204 that can facilitate a user 214 to generate one or more cooling system designs. Two-phase modeling component 104 can also include system solver component 206 that can automatically determine pressure (P), temperature (T), and vapor quality (x) values at various locations in the cooling system design, and coefficient of performance (COP) of the cooling system design. Two-phase modeling component 104 can also include part recommendation component 208 that can automatically generate recommendations for alternate parts that can improve coefficient of performance (COP) of a cooling system design.

In a non-limiting example, part specification component 202 can provide one or more user interfaces (not shown) that facilitate a user 214 manually creating a part object 302 associated with a part for a cooling system. In another non-limiting example, part specification component 202 can automatically obtain part objects 302 associated with parts from one or more databases on one or more network devices 120. For example, various part manufacturers can make respective part objects 302 associated with their parts available on the internet. In another example, third parties can make respective part objects 302 associated with parts from various part manufacturers available on the internet, such as in a downloadable part object library. It is to be appreciated that part objects obtained by part specification component 202 can be customized by one or more users 214. It is also to be appreciated that some of information in a part object 302 can be supplied by a part manufacturer or third party, while other information in the part object 302 can be supplied by one or more user 214. Part specification component 202 can store part objects 302 in part object library 116.

Figure 3:
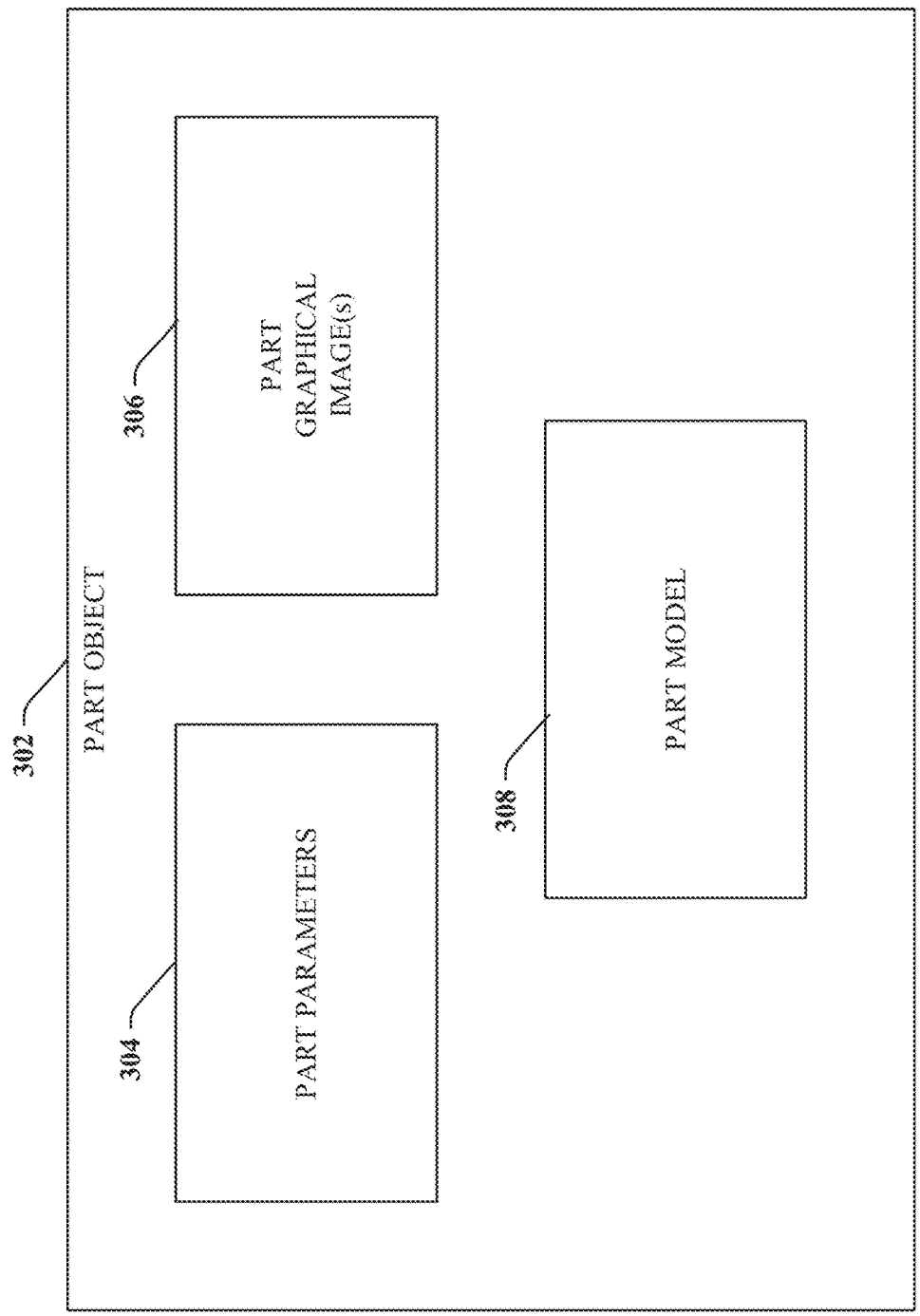
FIG. 3 illustrates a block diagram of an example, non-limiting part object associated with a part of a cooling system in accordance with one or more embodiments described herein.

Referring to FIG. 3, a block diagram is illustrated of an example, non-limiting part object 302 associated with a part of a cooling system in accordance with one or more embodiments described herein. Part object 302 can include part parameters 304 that define parameters associated with the part. In non-limiting examples, part parameters 304 can include part name, part model number, part identification number, part stock keeping unit (SKU), part manufacturer, part type (e.g. reservoir, pump, filter, micro-evaporator, cold plate, condenser, pipe, tube, flow meter, pre-heater, or any other suitable part type of a cooling system), coolant types (e.g. water, dielectric liquid, liquid nitrogen, liquid helium, or any other suitable liquid coolant) supported, dimensions, size, material part is made from, thermal characteristics, parameters associated with computing outputs values of P, T, and x at an outlet of the part, part availability, substitute parts for the part, or any other suitable parameters associated with a part of a cooling system.

Part object 302 can also include one or more part graphical images 306 that depict the part graphically. For example, one or more part graphical images 306 can be employed to represent the part in a graphical depiction of a cooling system design in which the part has been configured.

Figure 4:
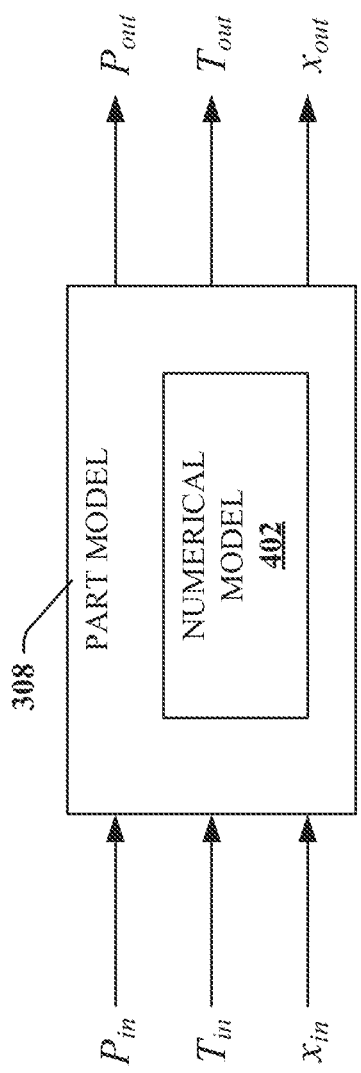
FIG. 4 illustrates a block diagram of an example, non-limiting part model associated with a part object in accordance with one or more embodiments described herein.

Part object 302 can also include part model 308. Referring to FIG. 4, a block diagram is illustrated of an example, non-limiting part model 308 associated with a part object 302 in accordance with one or more embodiments described herein. Part model 308 can define a numerical model 402, which can be employed for the part object 302 to determine outputs values of $P_{out}$, $T_{out}$, and $x_{out}$ at an outlet of the part associated with part object 302 and based on input values of $P_{in}$, $T_{in}$, and $x_{in}$ at an inlet of the part, and optionally based on any other needed part parameters 304 and/or cooling system parameters 622 according to the numerical model 402.

The exact form of numerical model 402 can vary from part to part. For a two-phase system, phase change occurs with energy transfer. Regardless of whether the flow of coolant is single-phase or two-phase, or whether phase change happens or not, total enthalpy can be conserved. Energy conservation in the form of an enthalpy equation is shown in Equation (1). For any part in the system, $h_{in}$ is known either as an output from preceding part in the cooling system design or as a starting assumption and $\Delta h$ is also known since it is the total energy added or subtracted into or from the component, including the small amount of heat exchange with the environment. For example, heat generated by and/or heat dissipation from a heat source can be an input to a system model (e.g., two-phase cooling system model). Therefore, $h_{out}$ can be calculated by Equation (1). In order to define the thermodynamic state of the coolant, another thermodynamic property is required. In a non-limiting example, $P_{out}$ can be employed which is calculated by using Equation (2). Using $h_{out}$ and $P_{out}$ as part outputs, $T_{out}$ and $x_{out}$ can be calculated. Similarly, to the enthalpy calculation, for any component, $P_{in}$ is known either as an output from preceding part in the cooling system design or as a starting assumption. However, $\Delta P$ is not known and can be calculated using a process described below.

$$h_{out}=h_{in}+\Delta h \quad \text{Equation (1):}$$

$$P_{out}=P_{in}+\Delta P \quad \text{Equation (2):}$$

The pressure difference $\Delta P$ across a part can be obtained in different ways. For a part in the cooling system, the pressure difference $\Delta P$ can be characterized in term of flow rate. In a non-limiting example, a pump, which is a flow motivator, $\Delta P$ is positive; for other parts in the cooling system such as pipes, valves and the micro-evaporator, which have a flow resistance, $\Delta P$ is negative. This characteristic of a part is called the pressure-volume (P-V) curve. In an example, a P-V curve for a part can be generated from experiments. In another example, a P-V curve for a part can be available in information provided by a part manufacturers or other third party. Numerical model 402 can employ a P-V curve to interpolate $\Delta P$ for a part.

For some parts, such as pipes, the approach of using a P-V curve can become more difficult for two reasons. The first reason is that the piping in a cooling system is variable with different length, number of bends and altitude (relative height differences). Therefore, it can be very tedious to characterize the P-V curve with experiments for each pipe section. The second reason is that the flow in each pipe could be single-phase with different temperatures or two-phase with different flow regimes (e g laminar flow, turbulent flow, transitional flow, or any other suitable flow regime). As such, the full characterization of each pipe would require not just one P-V curve, but many P-V curves, which is not practical. To overcome this challenge, numerical model 402 can employ Equation (3), which is a momentum conservation equation for general flows (single-phase or two-phase).

$$-\left(\frac{dP}{dz}\right)_{total} = \left(\frac{dP}{dz}\right)_{fr} + \left(\frac{dP}{dz}\right)_{g} + \left(\frac{dP}{dz}\right)_{mo} \quad \text{Equation (3)}$$

Per Equation (3), the total pressure gradient along the flow direction z can have three contributors: the frictional force, the gravitational force, and the change of momentum due to acceleration or deceleration.

In a non-limiting example, for Equation (3), the gravitational force contribution can be defined by Equation 4, and contribution from the change of momentum due to acceleration or deceleration can be defined by Equation 5.

$$\left(\frac{dP}{dz}\right)_{g} = [(1-\alpha)\rho_l + \alpha\rho_v]g \cdot \sin\theta \quad \text{Equation (4)}$$

$$\left(\frac{dP}{dz}\right)_{mo} = \frac{d}{dz}\left[\frac{G^2 x^2}{\rho_v \alpha} + \frac{G^2(1-x)^2}{\rho_l(1-\alpha)}\right] \quad \text{Equation (5)}$$

Equations (3)-(5) can be generated based on three assumptions. The first assumption is that the cross-section of the flow has the same area along the flow direction. The second assumption is that the velocities of liquid and vapor phases may be different, but within each phase the velocity is uniform. The third assumption is that both the liquid phase and the vapor phase are in local thermodynamic equilibrium. All pressure drop (force) contributors have their explicit forms for evaluation except for the frictional force. The reason is that there may be no accurate theoretical model for frictional pressure gradient; however there may be numerous known correlation models. The numerical model 402 can be customized by user 214 to choose different known correlation models for frictional pressure gradient or can define their own correlation model for frictional pressure gradient.

In a non-limiting example, a correlation model for frictional pressure gradient that can be employed by numerical model 402 is a Lockhart-Martinelli correlation model, which is described by equation (6).

$$\left(\frac{dP}{dz}\right)_{fr} = -\phi_l^2 \left(\frac{dP}{dz}\right)_l \quad \text{Equation (6)}$$

$$\left(\frac{dP}{dz}\right)_l = -\frac{2f_l G^2 (1-x)^2}{\rho_l D} \quad \text{Equation (7)}$$

where the liquid friction factor $f_l$ can be defined by equation (8)

$$f_l = a\left(\frac{G(1-x)D}{\mu_l}\right)^n \quad \text{Equation (8)}$$

in which a and n will take different values for different flow regimes. In a non-limiting example, for laminar flows, a=16, n=1; for turbulent flows, a=0.079, n=0.25. In Equation (6), $\phi_l^2$ is a multiplier that can be defined by Equation (9).

$$\phi_l^2 = 1 + \frac{C}{X_{tt}} + \frac{1}{X_{tt}^2} \quad \text{Equation (9)}$$

Where C is determined by the flow regimes of both liquid and vapor phases, which is listed in Table 1.

TABLE 1

| C value for Lockhart-Martinelli model | | |
|---|---|---|
| Liquid | Vapor | C |
| Turbulent | Turbulent | 20 |
| Laminar | Turbulent | 12 |
| Turbulent | Laminar | 10 |
| Laminar | Laminar | 5 |

In Equation (9), $X_{tt}$ is a Martinelli parameter that can be defined by equation (10).

$$X_{tt} = \left(\frac{1-x}{x}\right)^{0.9}\left(\frac{\rho_v}{\rho_l}\right)^{0.5}\left(\frac{\mu_l}{\mu_v}\right)^{0.1} \quad \text{Equation (10)}$$

Figure 5:
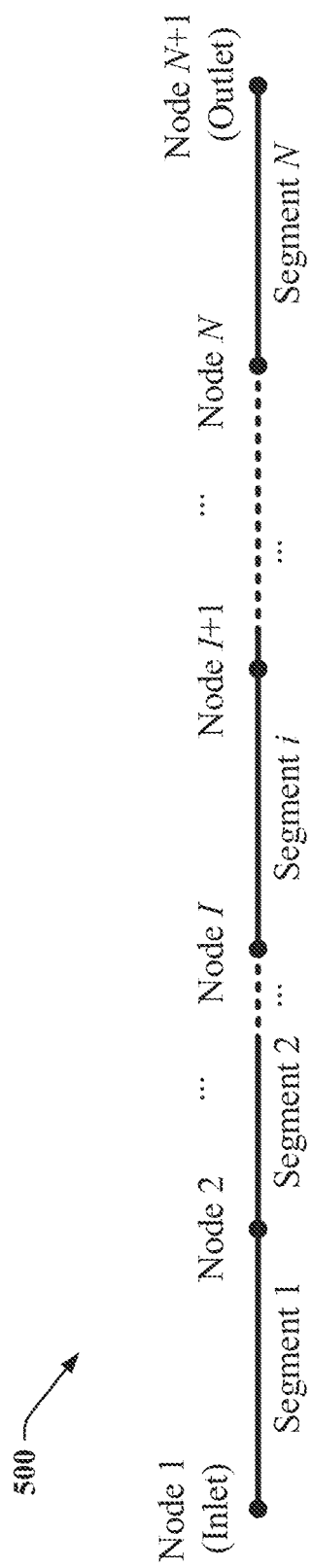
FIG. 5 illustrates a block diagram of an example, non-limiting system for discretizing of a flow channel into segments with equal spacing in accordance with one or more embodiments described herein.

Using equations (3)-(10), the total pressure gradient can be calculated. In order to calculate the pressure difference ΔP across the part, it is necessary to take the integral of the pressure gradient over the length of the flow channel. In a non-limiting example, numerical model 402 can determine the numerical integral by discretizing the flow channel into segments with equal spacing Referring to FIG. 5, a block diagram is illustrated of an example, non-limiting discretizing of a flow channel 500 into segments with equal spacing in accordance with one or more embodiments described herein. The flow channel 500 can be divided into N segments with equal spacing Δz, with e N+1 nodes, where node 1 is the inlet of the part and node N+1 is the outlet of the part. In segment i, for frictional force and gravitational force, their respective pressure gradients at two terminal nodes I and I+1 are determined by numerical model 402, by Equations (11) and (12).

$$\begin{cases} \left(\frac{dP}{dz}\right)_{fr,I} = -\phi_{l,I}^2 \left(\frac{dP}{dz}\right)_{l,I} \\ \left(\frac{dP}{dz}\right)_{fr,I+1} = -\phi_{l,I}^2 \left(\frac{dP}{dz}\right)_{l,I+1} \end{cases} \quad \text{Equation (11)}$$

$$\begin{cases} \left(\frac{dP}{dz}\right)_{g,I} = [(1-\alpha_I)\rho_{l,I} + \alpha_I \rho_{v,I}]g \cdot \sin\theta \\ \left(\frac{dP}{dz}\right)_{g,I+1} = [(1-\alpha_{I+1})\rho_{l,I+1} + \alpha_{I+1}\rho_{v,I+1}]g \cdot \sin\theta \end{cases} \quad \text{Equation (12)}$$

Then, a simple average between two terminal nodes can be determined by numerical model 402 using Equations (13) and (14), which are respectively the frictional force and gravitational force pressure gradients in segment i.

$$\left(\frac{dP}{dz}\right)_{fr,i} = \left[\left(\frac{dP}{dz}\right)_{fr,I} + \left(\frac{dP}{dz}\right)_{fr,I+1}\right]/2 \quad \text{Equation (13)}$$

$$\left(\frac{dP}{dz}\right)_{g,i} = \left[\left(\frac{dP}{dz}\right)_{g,I} + \left(\frac{dP}{dz}\right)_{g,I+1}\right]/2 \quad \text{Equation (14)}$$

The respective pressure drops due to frictional force and gravitational force in segment i can be determined by numerical model 402 using Equations (15) and (16).

$$(\Delta P)_{fr,i} = \left(\frac{dP}{dz}\right)_{fr,i} \Delta z = \Delta z \left[\left(\frac{dP}{dz}\right)_{fr,l} + \left(\frac{dP}{dz}\right)_{fr,l+1}\right]/2 \quad \text{Equation (15)}$$

$$(\Delta P)_{g,i} = \left(\frac{dP}{dz}\right)_{g,i} \Delta z = \Delta z \left[\left(\frac{dP}{dz}\right)_{g,l} + \left(\frac{dP}{dz}\right)_{g,l+1}\right]/2 \quad \text{Equation (16)}$$

Numerical model 402 can determine respective pressure drops due to frictional force and gravitational force each segment and sum them together to determine the pressure drops due to frictional forces and gravitational forces along the entire flow channel as can be defined by Equations (17) and (18).

$$(\Delta P)_{fr} = \Sigma_1^N (\Delta P)_{fr,i} \quad \text{Equation (17):}$$

$$(\Delta P)_g = \Sigma_1^N (\Delta P)_{g,i} \quad \text{Equation (18):}$$

For the third contributor of total pressure gradient, the change of momentum, can also be calculated like the other two, but because all internal terms will be canceled out with only the first and last terms left, the pressure drop due to momentum change can be determined by numerical model 402 using Equation (19).

$$(\Delta P)_{mo} = \left[\frac{G^2 x^2}{\rho_v \alpha} + \frac{G^2(1-x)^2}{\rho_l(1-\alpha)}\right]_{out} - \left[\frac{G^2 x^2}{\rho_v \alpha} + \frac{G^2(1-x)^2}{\rho_l(1-\alpha)}\right]_{in} \quad \text{Equation (19)}$$

The total pressure gradient along the flow channel can be determined by numerical model 402 using Equation (20).

$$-(\Delta P)_{total} = (\Delta P)_{fr} + (\Delta P)_g + (\Delta P)_{mo} \quad \text{Equation (20):}$$

All variables can be changing along the flow direction. Therefore, those variables can be calculated at each node of the discretized flow channel separately. Among those variables, the vapor quality x can dramatically affect the pressure difference. Therefore, numerical model 402 can identify the impactors that would change x and then calculate x at each node (or, in some embodiments, at one or more nodes). In a non-limiting example, two impactors can be external heat and pressure. However, since external heat has greater impact on the change of x than pressure, numerical model 402 can assume that external heat is the only contributor to x along the flow direction. Numerical model 402 can then determine the total pressure gradient by determining a profile of vapor quality along the flow channel with a known external heat profile. The external heat profile can be defined as one or more part parameters 304 and/or a cooling system parameters 622. The external heat profile identifies the heat flux at each node. In a non-limiting example, Numerical model 402 can determine the heat flux for segment i using equation (21).

$$hf_i = [hf_I + hf_{I+1}]/2 \quad \text{Equation (21):}$$

Numerical model 402 can use the energy conservation within segment i and known conditions at node I to determine the vapor quality at node I+1. Numerical model 402 can perform this determination sequentially from left to right for each segment to determine the vapor quality at each node. The determination for the last segment will generate the vapor quality at the outlet $x_{out}$. However, this value for $x_{out}$ is only used to calculate the pressure drop in the last segment. In a non-limiting example, numerical model 402 can determine $x_{out}$ for the part using $h_{out}$, $P_{out}$ and energy conservation equations based on state. In another example, for a special case, in which the external heat is zero, numerical model 402 can assume that the vapor quality does not change along the flow direction. However, $x_{out}$ may be different from $x_{in}$ due to change in state (e.g. between liquid and vapor) of the coolant from inlet to outlet.

In a non-limiting example, for a part in which the coolant remains in a single phase the change in vapor quality can be determined by numerical model 402 using Equation (22). The change in temperature across the part for a liquid phase $(\Delta T)_L$ can be determined by numerical model 402 using Equation (23), and the change in temperature across the part for a vapor phase $(\Delta T)_V$ can be determined by numerical model 402 using Equation (24).

$$\Delta x = 0 \quad \text{Equation (22)}$$

$$(\Delta T)_L = \frac{\Delta_q}{(C_p)_L} \quad \text{Equation (23)}$$

$$(\Delta T)_V = \frac{\Delta_q}{(C_p)_V} \quad \text{Equation (24)}$$

where $(C_p)_L$ is the liquid specific heat for the coolant, and $(C_p)_V$ is the vapor specific heat for the coolant.

In a non-limiting example, for a part in which the coolant is in two-phase, pressure drop will shift the saturation temperature $T_{sat}$, and the change in vapor quality $\Delta x$ across the part can be determined by numerical model 402 using Equation (26), and the change in coolant temperature $(\Delta T)$ is assumed to be equal to the change in saturation temperature across the part $\Delta T_{sat}$ and can be determined by numerical model 402 using Equation (25).

$$\Delta T = \Delta T_{sat} = \Delta T_{sat,in} - \Delta T_{sat,out} \quad \text{Equation (25)}$$

$$\Delta x = \frac{\Delta_q}{h_{LV}} - \frac{\Delta T_{sat}[x(C_p)_V + (1-x)(C_p)_L]}{h_{LV}} \quad \text{Equation (26)}$$

Where $T_{sat,in}$ is a function of pressure at the inlet of the component and $T_{sat,out}$ is a function of pressure at the outlet of the component and can be determined using the EOS (Equations of state). Alternatively, mathematical function of the form of Equation (27) can be used:

$$T_{sat}[C] = 55.8426 * \left(\frac{p_{abs}}{1[MPa]}\right)^3 - 137.2327 * \left(\frac{p_{abs}}{1[MPa]}\right)^2 + 161.6659 * \left(\frac{p_{abs}}{1[MPa]}\right) - 28.39 \quad \text{Equation (27)}$$

where $P_{abs}$ is absolute pressure.

Numerical model 402 can then employ $\Delta T$ and $\Delta x$ to solve for $T_{out}$ and $x_{out}$ using Equations (28) and (29).

$$\Delta T = T_{out} - T_{in} \quad \text{Equation (28):}$$

$$\Delta x = x_{out} - x_{in} \quad \text{Equation (29):}$$

In a non-limiting example, for a pump, numerical model 402 can employ a P-V curve for the pump to determine the pressure head, a positive $\Delta P$, under different flow rate and then use Equation (2) to determine the pressure $P_{out}$ at the outlet of the pump. Numerical model 402 can employ equations (22)-(28) determine temperature $T_{out}$ and vapor quality $x_{out}$ at the outlet of the pump.

In another non-limiting example, for a condenser, a model can be based on a half full physical model, in which a split is taken at the heat transfer between the refrigerant coolant and ambient environment. The temperature of the ambient environment can be assumed as a constant value. The heat can be simply rejected into ambient environment. Therefore, in a non-limiting example, numerical model 402 can treat a condenser as a pipe.

In another example, a reservoir dampens the oscillation of the flow and therefore stabilizes a cooling system. The reservoir can also provide subcooled flow at its outlet by creating a liquid column within its container. The reservoir introduces some discontinuity between its inlet and outlet, and therefore numerical model 402 can employ Equation (29) to determine $P_{out}$ at the outlet of the reservoir.

$$P_{out} = \tfrac{1}{2}P_{in} + \tfrac{1}{2}P_r + \Delta P_{lc} \quad \text{Equation (29):}$$

where $P_r$ is the static pressure inside of the reservoir and $\Delta P_{lc}$ is the pressure head due to the liquid column.

Numerical model 402 can assume that the coolant inside of the reservoir is always saturated and thus, $P_r$ is equal to the coolants saturation pressure. Then, numerical model 402 can employ a known saturation temperature for the coolant (e.g. temperature inside of the reservoir $T_r$) and determine $P_r$ using the coolant's saturation properties. Numerical model 402 can also assume that the temperature inside of the reservoir $T_r$ is equally influenced by the ambient temperature $T_{amb}$ and the temperature of the reservoir inlet $T_{in}$, and can determine $T_r$ using equation (30).

$$T_r = \tfrac{1}{2}T_{amb} + \tfrac{1}{2}T_{in} \quad \text{Equation (30):}$$

Numerical model 402 can determine the pressure head due to liquid column $\Delta P_{lc}$ using equation (31).

$$\Delta P_{lc} = \Delta P_{lc} = \rho_l g H \quad \text{Equation (31):}$$

where the height of the liquid column H is known and should be a constant value for steady-state model. Numerical model 402 can then employ equations (22)-(28) determine temperature $T_{out}$ and vapor quality $x_{out}$ at the outlet of the reservoir.

It is to be appreciated that the above equations are non-limiting examples of equation that can be employed by numerical model 402, and the numerical model 402 can employ any suitable equations and/or algorithms to determine $P_{out}$, $T_{out}$, and $x_{out}$ at an outlet of the part associated with part object 302.

Referring back to FIG. 2, cooling system design component 204 can facilitate a user 214 configuring a cooling system design. Cooling system design component 204 can present one or more user interfaces (not shown) with tools the enable user 214 to user 214 to configure a cooling system design using part objects 302 from a part object library 116. In a non-limiting example, user 214 can drag and drop part graphical images 306 representing part objects 302 in a flow order to configure a cooling system design. In another example, user 214 can create a list of part objects 302 in a flow order to configure a cooling system design. Cooling system design component 204 facilitates user 214 defining cooling system parameters 622 (e.g. flow rate for the cooling system design, coolant type employed in the coolant system design, liquid and/or vapor phases of the coolant at various location in the cooling system design, single or two-phase of the coolant at various location in the cooling system design, ambient environmental parameters at various location in the cooling system design, heat applied at various location in the cooling system design, or any other suitable parameters) for a cooling system design. It is to be appreciated that any suitable mechanism for a user 214 to configure a cooling system design can be employed by cooling system design component 204. Cooling system design component 204 can store cooling system designs generated by user 214 in cooling system design(s) storage 118.

Figure 6:
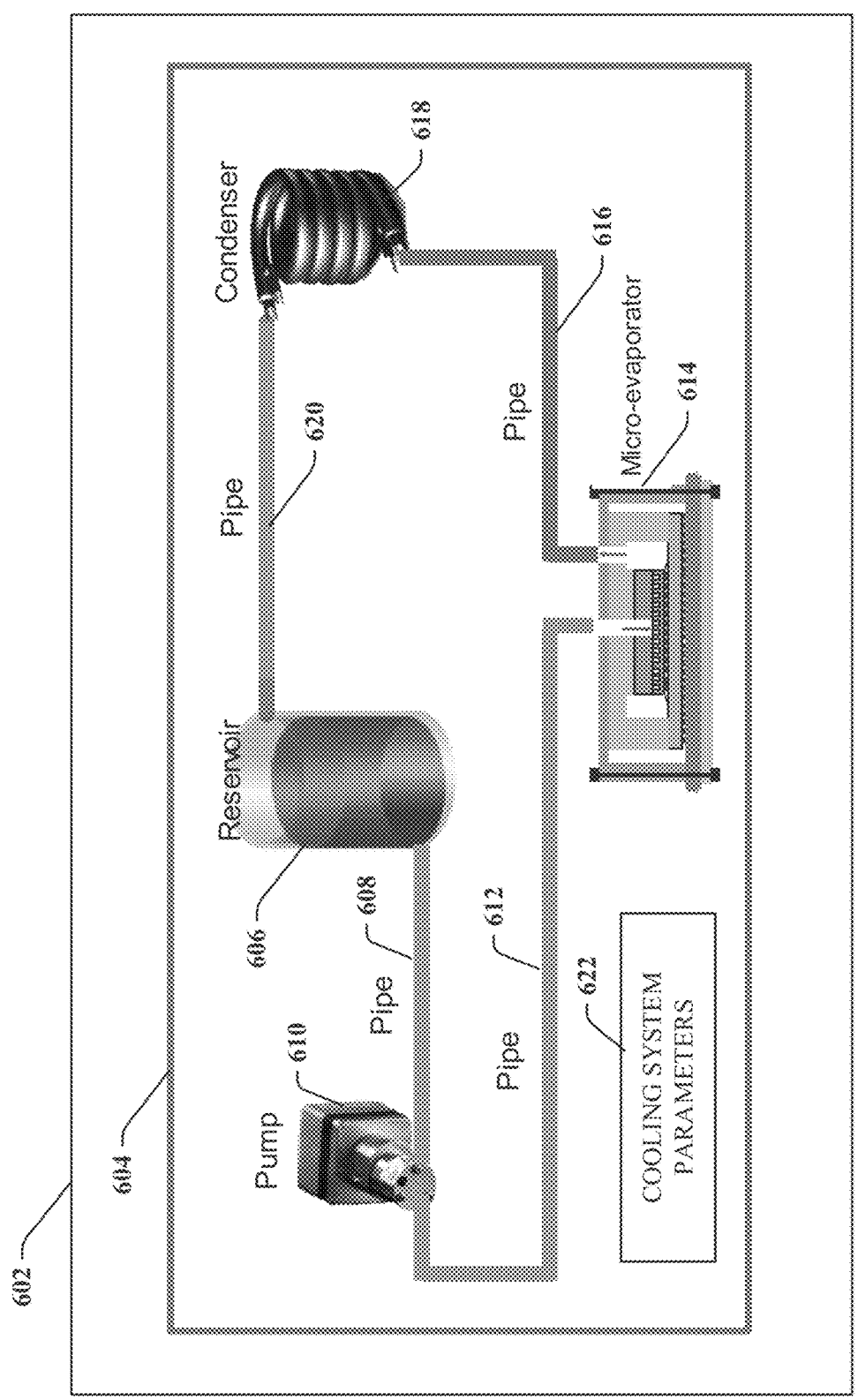
FIG. 6 illustrates a block diagram of an example, non-limiting annotated user interface that depicts a non-limiting example cooling system design in accordance with one or more embodiments described herein.

FIG. 6 illustrates a block diagram of an example, non-limiting user interface 602 that depicts a non-limiting example cooling system design 604 in accordance with one or more embodiments described herein. Cooling system design 604 includes a reservoir part object 606 with an outlet that is connected to an inlet of pipe part object 608. Pipe part object 608 has an outlet that is connected to an inlet of pump part object 610. Pump part object 610 has an outlet that is connected to an inlet of pipe part object 612. Pipe part object 612 has an outlet that is connected to an inlet of micro-evaporator part object 614. Micro-evaporator part object 614 has an outlet that is connected to an inlet of pipe part object 616. Pipe part object 616 has an outlet that is connected to an inlet of condenser part object 618. Condenser part object 618 has an outlet that is connected to an inlet of pipe part object 620. Pipe part object 620 has an outlet that is connected to an inlet of reservoir part object 606. Coolant is in single phase in reservoir part object 606, pipe part object 608, pump part object 610, pipe part object 612, pipe part object 616, and pipe part object 620. Coolant is in two-phase in micro-evaporator part object 614 and condenser part object 618. Coolant part object is in liquid phase in reservoir part object 606, pipe part object 608, pump part object 610, pipe part object 612, and pipe part object 620. Coolant is in vapor phase in pipe part object 616.

Referring back to FIG. 2, system solver component 206 that can automatically determine steady state pressure (P), temperature (T), and vapor quality (x) values at various locations in the cooling system design, and coefficient of performance (COP) of the cooling system design. System solver component 206 can generate a system model (e.g., two-phase cooling system model) of a cooling system design in terms the part models 308 associated with parts objects 302 of the cooling system design.

Figure 7:
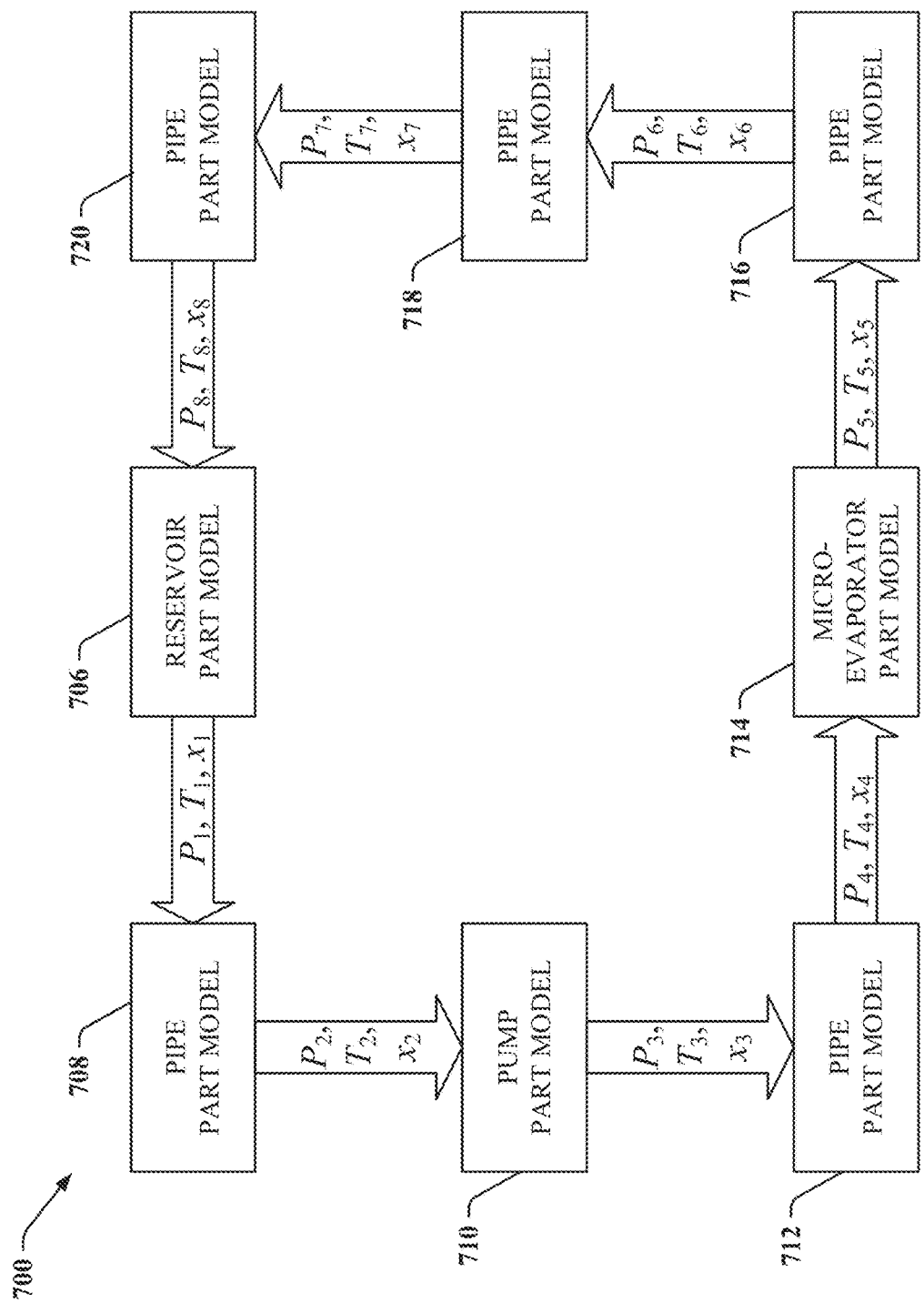
FIG. 7 illustrates a block diagram of an example, non-limiting system model generated by a system solver component based on a cooling system design in accordance with one or more embodiments described herein.

FIG. 7 illustrates a block diagram of an example, non-limiting system model 700 generated by system solver component 206 based on cooling system design 604 in accordance with one or more embodiments described herein. System model 700 comprises reservoir part model 706 associated with reservoir part object 606, pipe part model 708 associated with pipe part object 608, pump part model 710 associated with pump part object 610, pipe part model 712 associated with pipe part object 612, micro-evaporator part model 714 associated with micro-evaporator part object 614, pipe part model 716 associated with pipe part object 616, condenser part model 718 associated with condenser part object 618, and pipe part model 720 associated with pipe part object 620. $P_1$, $T_1$, $x_1$ are output from reservoir part model 706 and input to pipe part model 708; $P_2$, $T_2$, $x_2$ are output from pipe part model 708 and input to pump part model 710; $P_3$, $T_3$, $x_3$ are output from pump part model 710 and input to pipe part model 712; $P_4$, $T_4$, $x_4$ are output from pipe part model 712 and input to micro-evaporator part model 714; $P_5$, $T_5$, $x_5$ are output from micro-evaporator part model 714 and input to pipe part model 716; $P_6$, $T_6$, $x_6$ are output from pipe part model 716 and input to condenser part model 718; $P_7$, $T_7$, $x_7$ are output from condenser part model 718 and input to pipe part model 720; and $P_8$, $T_8$, $x_8$ are output from pipe part model 720 and input to reservoir part model 706. In order to solve for the values of $P_1$, $T_1$, $x_1$, $P_2$, $T_2$, $x_2$, $P_3$, $T_3$, $x_3$, $P_4$, $T_4$, $x_4$, $P_5$, $T_5$, $x_5$, $P_6$, $T_6$, $x_6$, $P_7$, $T_7$, $x_7$, $P_8$, $T_8$, and $x_8$ at steady state for cooling system design 604, system solver component 206 can select an initial inlet-outlet junction between two adjacent part objects of in the flow of cooling system design 604 as a starting point and select initial values for P, T, an x input to the part model associated with inlet at the inlet-outlet junction, and then compute the values of P, T, an x at each inlet-outlet junction along the flow of the cooling system design 604 to produce P', T', an x' at the outlet of the initial inlet-outlet junction. For example, to select initial values for P, T, an x, and assumption can be made that the coolant is in a liquid phase everywhere in the cooling system. In another example, initial values for P, T, an x can be provided as input to the system model. In another non-limiting example, x=0, P=$P_{sat}$ at 5 C above room temperature, T=room temperature. System solver component 206 can compare P to P', T to T', an x to x'. If P is not within a threshold $P_{threshold}$ of P, T is not within a threshold $T_{threshold}$ of T', and x is not within a threshold $x_{threshold}$ of x', then system solver component 206 can set P equal to P', T equal to T', an x equal to x' and then compute the values of P, T, an x at each inlet-outlet junction along the flow of the cooling system design 604 to produce P', T', an x' again. If P is within the threshold $P_{threshold}$ of P, T is within the threshold $T_{threshold}$ of T', and x is within the threshold $x_{threshold}$ of x', then the values of P, T, an x at each inlet-outlet junction along the flow of the cooling system design 604 will be used by system solver component 206 as the steady state values for the cooling system design 604. It is to be appreciated that system solver component 206 can select any inlet-outlet junction of cooling system design 604 as the initial inlet-outlet junction.

System solver component 206 can also determine a coefficient of performance (COP) for cooling system design 604 using any suitable algorithm for determining COP. For example, system solver component 206 can perform a division operation where the numerator is an amount of heat transferred by cooling system design 604 (e.g. from condenser 618) to the ambient environment from a heat source (e.g. heat source at micro-evaporator part object 614) and the denominator is a sum of respective amounts of power employed by part objects 606, 608, 610, 612, 614, 616, 618, and 620 of the cooling system design 604 to achieve the transfer of heat to the ambient environment. In an exemplary case, for a heat dissipation from micro-evaporator part object 614 of 100 watts, the power employed by the pump part object 610 can be 1 watt and the power employed by condenser part object 618 can be 4 watts and zero watts from all other part objects to transfer the heat to the ambient environment. In this case, the COP will by 100 watts divided by 5 watts (=1 watt+4 watts), equaling to a value of 20.

Figure 8:
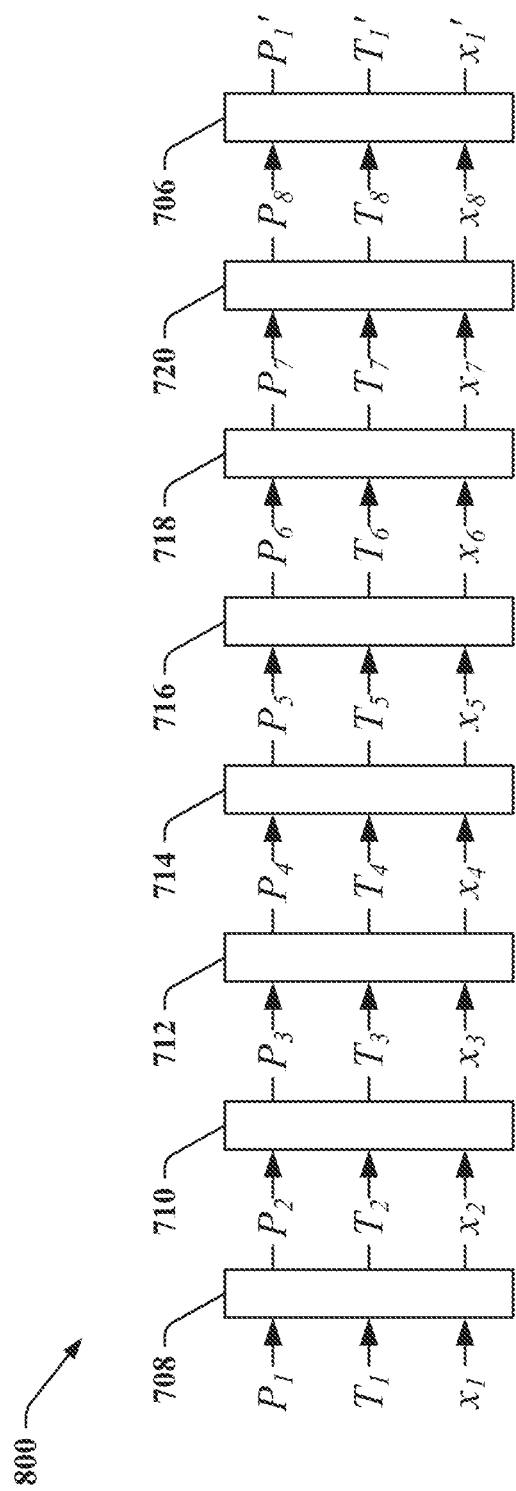
FIG. 8 illustrates a block diagram of an example, non-limiting system model employed by a system solver component for determining steady state values for a cooling system design in accordance with one or more embodiments described herein.

FIG. 8 illustrates a block diagram of an example, non-limiting system model 700 employed by system solver component 206 for determining steady state values for cooling system design 604 in accordance with one or more embodiments described herein. In this example, system solver component 206 has selected the inlet-outlet junction between reservoir part object 606 and pipe part object 608 as an initial inlet-outlet junction and selects initial values for $P_1$, $T_1$, $x_1$. System solver component 206 can provide $P_1$, $T_1$, $x_1$ to pipe part model 708 which produces $P_2$, $T_2$, $x_2$ at the inlet-outlet junction between pipe part object 608 and pump part object 610. System solver component 206 can provide $P_2$, $T_2$, $x_2$ to pump part model 710 which produces $P_3$, $T_3$, $x_3$ at the inlet-outlet junction between pump part object 610 and pipe part object 612. System solver component 206 can provide $P_3$, $T_3$, $x_3$ to pipe part model 712 which produces $P_4$, $T_4$, $x_4$ at the inlet-outlet junction between pipe part object 612 and micro-evaporator part object 614. System solver component 206 can provide $P_4$, $T_4$, $x_4$ to micro-evaporator part model 714 which produces $P_5$, $T_5$, $x_5$ at the inlet-outlet junction between micro-evaporator part object 614 and pipe part object 616. System solver component 206 can provide $P_5$, $T_5$, $x_5$ to pipe part model 716 which produces $P_6$, $T_6$, $x_6$ at the inlet-outlet junction between pipe part object 616 and condenser part object 618. System solver component 206 can provide $P_6$, $T_6$, $x_6$ to condenser part model 718 which produces $P_7$, $T_7$, $x_7$ at the inlet-outlet junction between condenser part object 618 and pipe part object 620. System solver component 206 can provide $P_7$, $T_7$, $x_7$ to pipe part model 720 which produces $P_8$, $T_8$, $x_8$ at the inlet-outlet junction between pipe part object 620 and reservoir part object 606. System solver component 206 can provide $P_8$, $T_8$, $x_8$ to reservoir part model 706 which produces $P_1'$, $T_1'$, $x_1'$ at the inlet-outlet junction between reservoir part object 606 and pipe part object 608.

System solver component 206 can compare $P_1$ to $P_1'$, $T_1$ to $T_1'$, an $x_1$ to $x_1'$. If $P_1$ is not within a threshold $P_{threshold}$ of $P_1'$ $T_1$ is not within a threshold $T_{threshold}$ of $T_1'$, and $x_1$ is not within a threshold $x_{threshold}$ of $x_1'$, then system solver component 206 can set $P_1$ equal to $P_1'$, $T_1$ equal to $T_1'$, an $x_1$ equal to $x_1'$ and then compute the values of $P_2$, $T_2$, $x_2$, $P_3$, $T_3$, $x_3$, $P_4$, $T_4$, $x_4$, $P_5$, $T_5$, $x_5$, $P_6$, $T_6$, $x_6$, $P_7$, $T_7$, $x_7$, $P_8$, $T_8$, $x_8$, $P_1'$, $T_1'$, and $x_1'$, at each inlet-outlet junction along the flow of the cooling system design 604 again. If P is within the threshold $P_{threshold}$ of P', T is within the threshold $T_{threshold}$ of T', and x is within the threshold $x_{threshold}$ of x', then the values Of $P_2$, $T_2$, $x_2$, $P_3$, $T_3$, $x_3$, $P_4$, $T_4$, $x_4$, $P_5$, $T_5$, $x_5$, $P_6$, $T_6$, $x_6$, $P_7$, $T_7$, $x_7$, $P_8$, $T_8$, $x_8$, $P_1'$, $T_1'$, and $x_1'$ can be used by system solver component 206 as the steady state values for the cooling system design 604. It is to be appreciated that system solver component 206 can alternatively employ the most recent values for $P_1$, $T_1$, $x_1$ as steady state values for the cooling system design 604 instead of $P_1'$, $T_1'$, $x_1'$. System solver component 206 can generate one or more user interfaces and/or reports that provides information regarding the values of coefficient of performance (COP), $P_1$, $T_1$, $x_1$, $P_2$, $T_2$, $x_2$, $P_3$, $T_3$, $x_3$, $P_4$, $T_4$, $x_4$, $P_5$, $T_5$, $x_5$, $P_6$, $T_6$, $x_6$, $P_7$, $T_7$, $x_7$, $P_8$, $T_8$, and $x_8$ at steady state for cooling system design 604.

Figure 9:
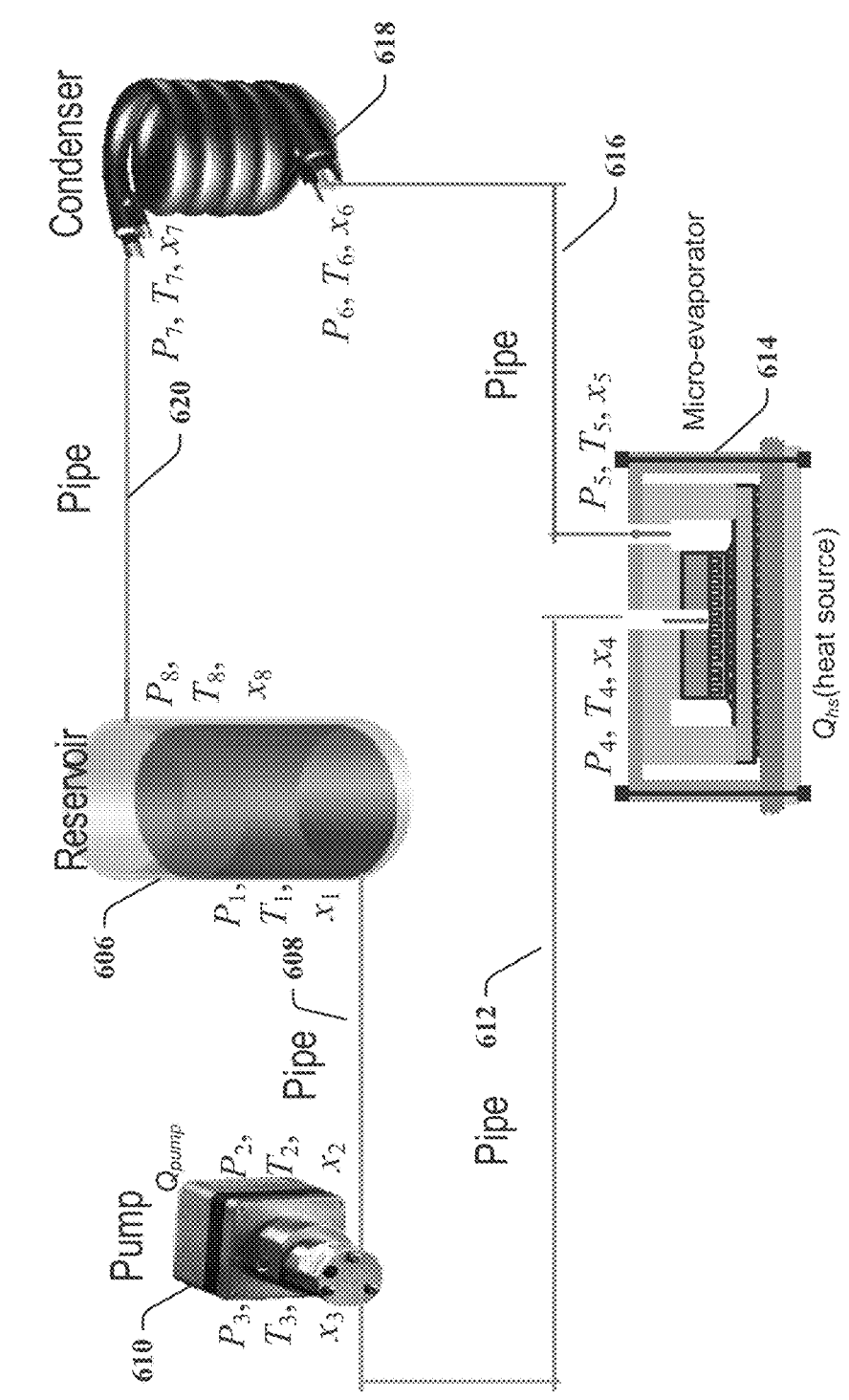
FIG. 9 illustrates a block diagram of an example, non-limiting user interface generated by a system solver component that depicts a non-limiting example cooling system design with steady state values in accordance with one or more embodiments described herein.

FIG. 9 illustrates a block diagram of an example, non-limiting user interface 902 generated by system solver component 206 that depicts a non-limiting example cooling system design 604 with steady state values in accordance with one or more embodiments described herein. User interface 902 can depict values of $P_1$, $T_1$, $x_1$, $P_2$, $T_2$, $x_2$, $P_3$, $T_3$, $x_3$, $P_4$, $T_4$, $x_4$, $P_5$, $T_5$, $x_5$, $P_6$, $T_6$, $x_6$, $P_7$, $T_7$, $x_7$, $P_8$, $T_8$, and $x_8$ at steady state for cooling system design 604. For example, User interface 902 can depict a steady state value for $P_1$ as "$P_1$=630", or in any other suitable display format. User interface 902 can also depict a values for the coefficient of performance (COP) for cooling system design 604, and one or more part parameters 304 and/or a cooling system parameters 622. For example, user interface depicts values for applied heat of $Q_{pump}$ at the pump part object 610 and $Q_{hs}$ from a heat source at micro-evaporator part object 614.

Referring back to FIG. 2, part recommendation component 208 can automatically generate recommendations for alternate parts that can improve coefficient of performance (COP) of a cooling system design. For example, part recommendation component 208 can identify alternate parts for parts in a cooling system design created by user 214, and generate respective alternate cooling system designs with an alternate part substituted for a part. Part recommendation component 208 can employ system solver component 206 to generate respective coefficients of performance (COP) for the alternate cooling system designs. Part recommendation component 208 can select one or more alternate parts that produced an improved coefficient of performance (COP) and generate a recommendation to user 214 with the selected alternate parts for the parts in the cooling system design created by user 214. For example, part recommendation component 208 can present a list of alternate parts for a part in the cooling system design created by user 214, and do this for each part where there is at least one alternate part that produced an improved coefficient of performance (COP). Part recommendation component 208 can further filter and/or rank the alternate parts based on one or more criteria, such as amount of improved coefficient of performance (COP), cost of alternate part, availability of alternate part, reliability of alternate part, similarity of the alternate part to the part (e.g. based on performance, dimensions, size, functions, material, or any other suitable characteristic of the alternate part or part), manufacturer of alternate part, utility analysis (e.g. cost-benefit analysis) or any other suitable criteria. Part recommendation component 208 can provide recommendations to user 214 in one or more user interfaces and/or reports.

While FIGS. 1, 2, and 3 depict separate components in computing device 102, it is to be appreciated that two or more components can be implemented in a common component. Further, it is to be appreciated that the design of the computing device 102 can include other component selections, component placements, etc., to facilitate automated system level modeling of a multitude of configurations of two-phase cooling systems and automatically generating recommendations for alternate parts that can improve coefficient of performance (COP) of a cooling system design in accordance with one or more embodiments described herein. Moreover, the aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components can be combined into a single component providing aggregate functionality. The components can also interact with one or more other components not specifically described herein for the sake of brevity, but known by those of skill in the art.

Further, some of the processes (e.g. including determinations made using equations described herein) performed by components described herein may be performed by specialized computers for carrying out defined tasks related to automated system level modeling of a multitude of configurations of two-phase cooling systems and automatically generating recommendations for alternate parts that can improve coefficient of performance (COP) of a cooling system design. The subject computer processing systems, methods apparatuses and/or computer program products can be employed to solve new problems that arise through advancements in technology, computer networks, the Internet and the like. The subject computer processing systems, methods apparatuses and/or computer program products can provide technical improvements to systems automated system level modeling of a multitude of configurations of two-phase cooling systems and automatically generating recommendations for alternate parts that can improve coefficient of performance (COP) of a cooling system design by improving processing efficiency among processing components in these systems, reducing delay in processing performed by the processing components, reducing storage, and/or improving the accuracy in which the processing systems facilitate automated system level modeling of a multitude of configurations of two-phase cooling systems and automatically generating recommendations for alternate parts that can improve coefficient of performance (COP) of a cooling system design.

It is to be appreciated that the any thresholds or criteria disclosed herein can be defined, operator specified, and/or dynamically determined, for example, based on learning algorithms The embodiments of devices described herein can employ artificial intelligence (AI) to facilitate automating one or more features described herein. The components can employ various AI-based schemes for carrying out various embodiments/examples disclosed herein. In order to provide for or aid in the numerous determinations (e.g., determine, ascertain, infer, calculate, predict, prognose, estimate, derive, forecast, detect, compute) described herein, components described herein can examine the entirety or a subset of the data to which it is granted access and can provide for reasoning about or determine states of the system, environment, etc. from a set of observations as captured via events and/or data. Determinations can be employed to identify a specific context or action, or can generate a probability distribution over states, for example. The determinations can be probabilistic—that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, etc.)) schemes and/or systems (e.g., support vector machines, neural networks, expert systems, Bayesian belief networks, fuzzy logic, data fusion engines, etc.) in connection with performing automatic and/or determined action in connection with the claimed subject matter. Thus, classification schemes and/or systems can be used to automatically learn and perform a number of functions, actions, and/or determination.

A classifier can map an input attribute vector, $z=(z1, z2, z3, z4, zn)$, to a confidence that the input belongs to a class, as by $f(z)=confidence(class)$. Such classification can employ a probabilistic and/or statistical-based analysis (e.g., factoring into the analysis utilities and costs) to determinate an action to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and/or probabilistic classification models providing different patterns of independence can be employed. Classification as used herein also is inclusive of statistical regression that is utilized to develop models of priority.

Figure 10:
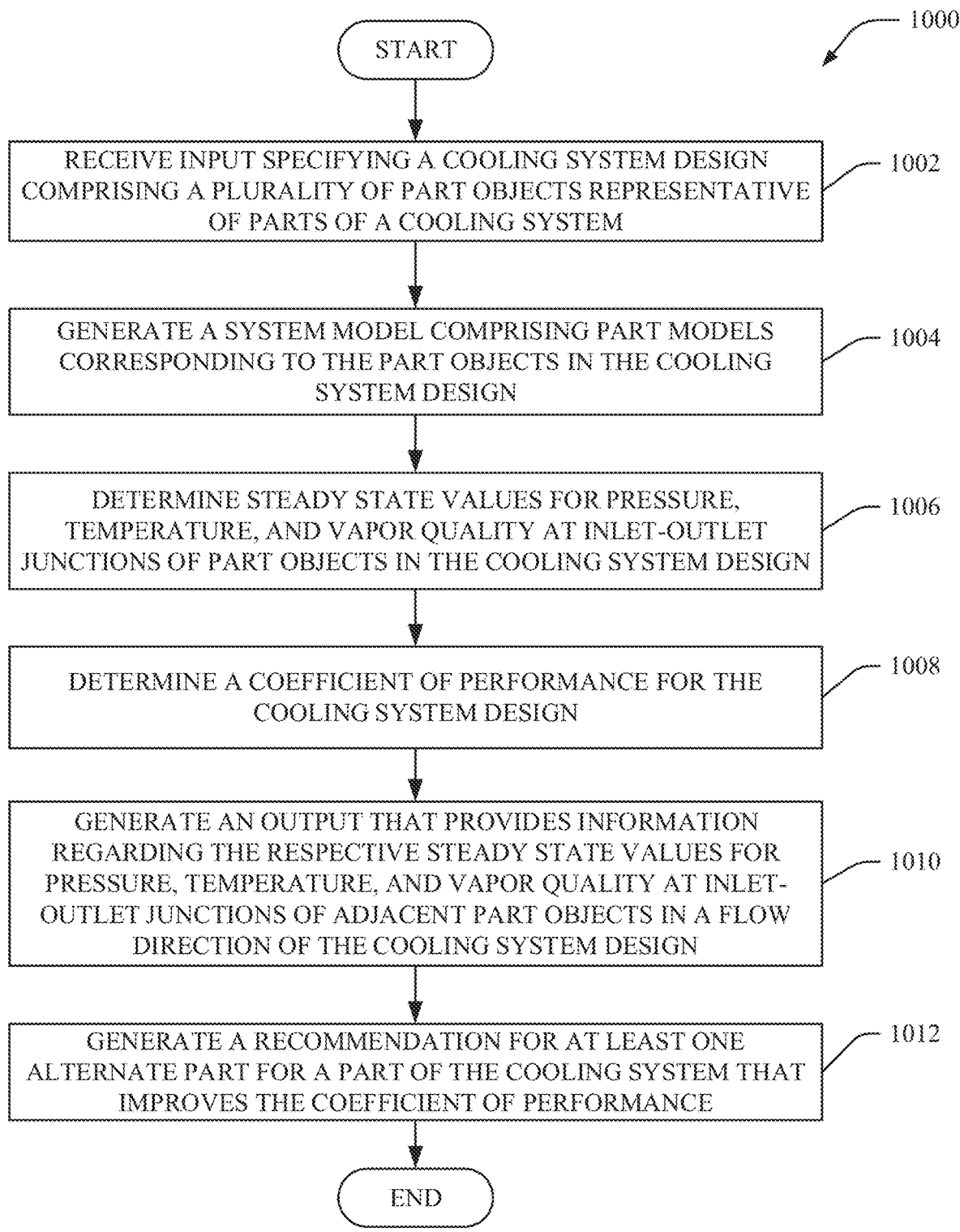
FIG. 10 illustrates a flow diagram of an example, non-limiting computer-implemented method that facilitates automatically determining steady state pressure (P), temperature (T), and vapor quality (x) values at various locations in the cooling system design, and coefficient of performance (COP) of a cooling system design in accordance with one or more embodiments described herein.

FIG. 10 illustrates a flow diagram of an example, non-limiting computer-implemented method 1000 that facilitates automatically determining steady state pressure (P), temperature (T), and vapor quality (x) values at various locations in the cooling system design, and coefficient of performance (COP) of the cooling system design in accordance with one or more embodiments described herein. Repetitive description of like elements employed in other embodiments described herein is omitted for sake of brevity.

At 1002, input is received specifying a cooling system design comprising a plurality of part objects representative of parts of a cooling system (e.g., via a part specification component 202, a cooling system design component 204, a two-phase modeling component 104 and/or a computing device 102). At 1004, a system model is generated comprising part models corresponding to the part objects in the cooling system design (e.g., via a system solver component 206, a two-phase modeling component 104 and/or a computing device 102). At 1006, steady state values are determined for pressure, temperature, and vapor quality at inlet-outlet junctions of part objects in the cooling system design (e.g., via a system solver component 206, a two-phase modeling component 104 and/or a computing device 102). At 1008, a coefficient of performance is determined for the cooling system design (e.g., via a system solver component 206, a two-phase modeling component 104 and/or a computing device 102). At 1010, an output is generated that provides information regarding the respective steady state values for pressure, temperature, and vapor quality at inlet-outlet junctions of adjacent part objects in a flow direction of the cooling system design (e.g., via a system solver component 206, a two-phase modeling component 104 and/or a computing device 102). At 1012, a recommendation is generated for at least one alternate part for a part of the cooling system that improves the coefficient of performance (e.g., via a part recommendation component 208, a system solver component 206, a two-phase modeling component 104 and/or a computing device 102).

Figure 11:
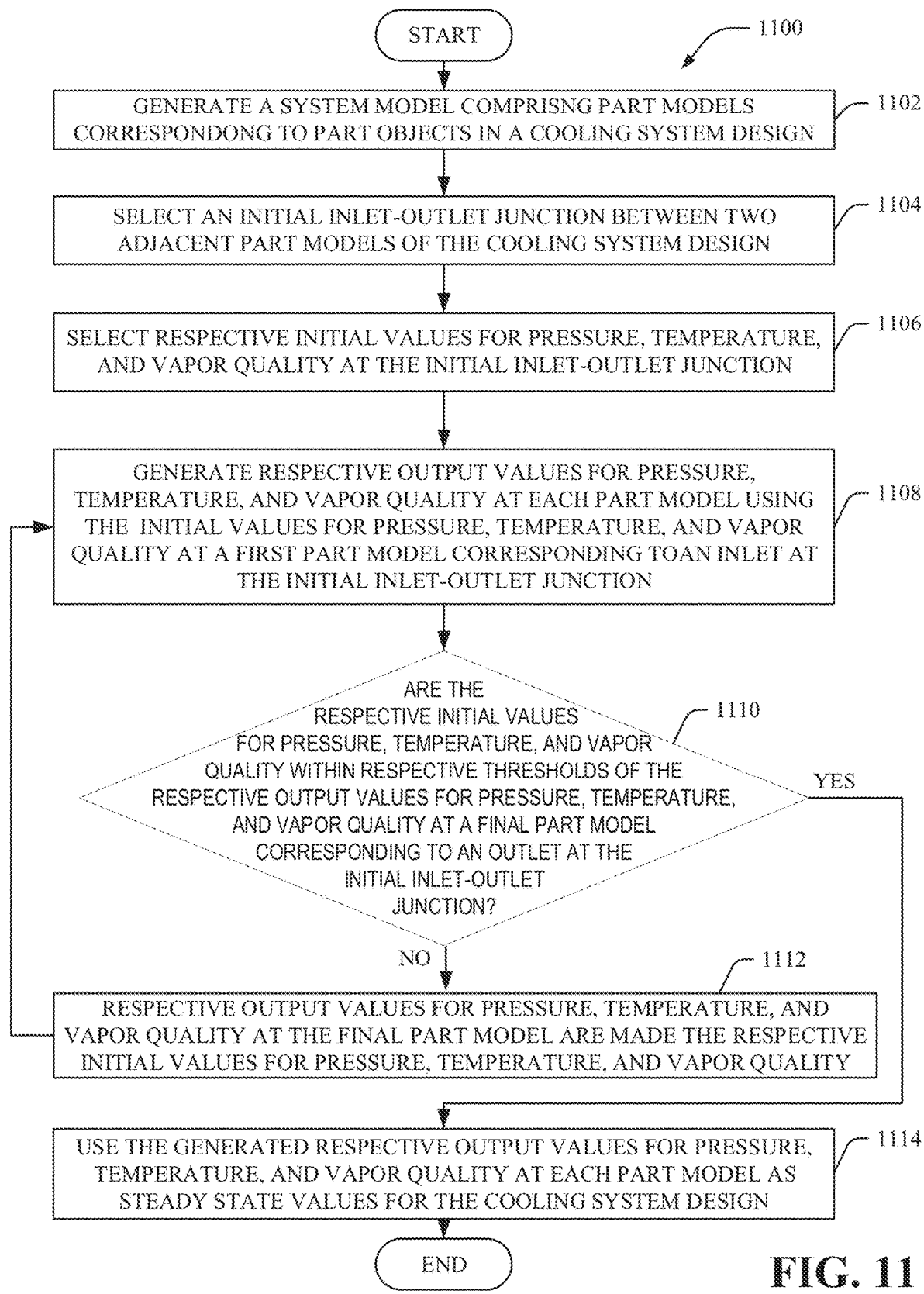
FIG. 11 illustrates a flow diagram of an example, non-limiting computer-implemented method that facilitates automatically determining steady state pressure (P), temperature (T), and vapor quality (x) values at inlet-outlet junctions in the cooling system design in accordance with one or more embodiments described herein.

FIG. 11 illustrates a flow diagram of an example, non-limiting computer-implemented method 1100 that facilitates automatically determining steady state pressure (P), temperature (T), and vapor quality (x) values at inlet-outlet junctions in the cooling system design in accordance with one or more embodiments described herein. Repetitive description of like elements employed in other embodiments described herein is omitted for sake of brevity.

At 1102, a system model is generated comprising part models corresponding to the part objects in the cooling system design (e.g., via a system solver component 206, a two-phase modeling component 104 and/or a computing device 102). At 1104, an initial inlet-outlet junction between two adjacent part models of the cooling system design is selected (e.g., via a system solver component 206, a two-phase modeling component 104 and/or a computing device 102). At 1106, respective initial values for pressure, temperature, and vapor quality at the initial inlet-outlet junction are selected (e.g., via a system solver component 206, a two-phase modeling component 104 and/or a computing device 102). At 1108, respective output values for pressure, temperature, and vapor quality at each part model are generated using the initial values for pressure, temperature, and vapor quality at a first part model corresponding to an inlet at the initial inlet-outlet junction (e.g., via a system solver component 206, a two-phase modeling component 104 and/or a computing device 102). At 1110, a decision is made whether respective initial values for pressure, temperature, and vapor quality are within respective thresholds of the respective output values for pressure, temperature, and vapor quality at a final part model corresponding to an outlet at the initial inlet-outlet junction (e.g., via a system solver component 206, a two-phase modeling component 104 and/or a computing device 102). If the decision is "YES", meaning the respective initial values for pressure, temperature, and vapor quality are within respective thresholds of the respective output values for pressure, temperature, and vapor quality at the final part model, the method proceeds to reference numeral 1114. If the decision is "NO", meaning the respective initial values for pressure, temperature, and vapor quality are not within respective thresholds of the respective output values for pressure, temperature, and vapor quality at the final part model, the method proceeds to reference numeral 1112. At 1112, respective output values for pressure, temperature, and vapor quality at the final part model are set as the respective initial values for pressure, temperature, and vapor quality, and the method proceeds to 1108 (e.g., via a system solver component 206, a two-phase modeling component 104 and/or a computing device 102). At 1114, the generated respective output values for pressure, temperature, and vapor quality at each part model are used as steady state values for the cooling system design (e.g., via a system solver component 206, a two-phase modeling component 104 and/or a computing device 102).

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 12:
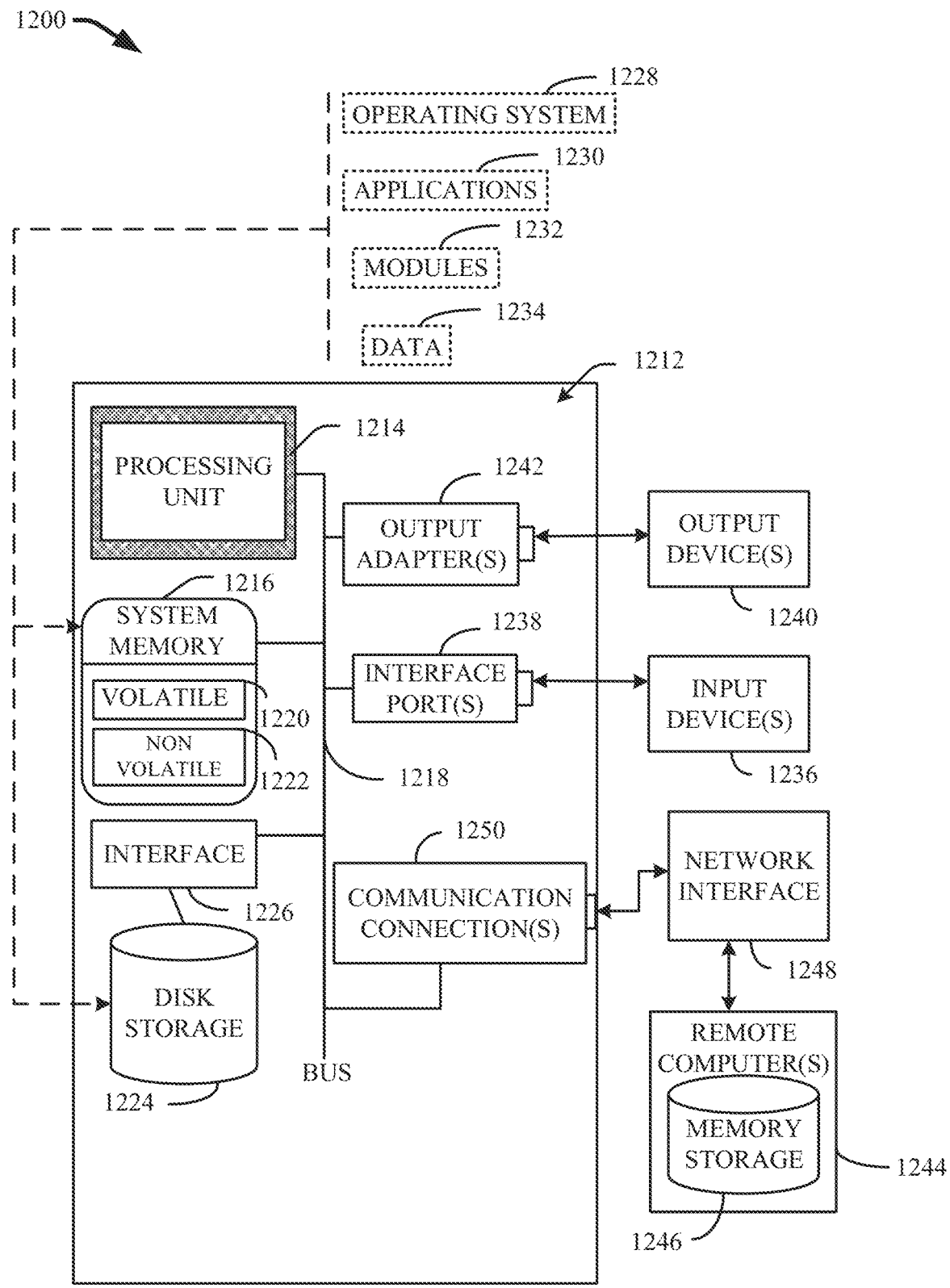
FIG. 12 illustrates a block diagram of an example, non-limiting operating environment in which one or more embodiments described herein can be facilitated.

In order to provide a context for the various aspects of the disclosed subject matter, FIG. 12 as well as the following discussion are intended to provide a general description of a suitable environment in which the various aspects of the disclosed subject matter can be implemented. FIG. 12 illustrates a block diagram of an example, non-limiting operating environment in which one or more embodiments described herein can be facilitated. Repetitive description of like elements employed in other embodiments described herein is omitted for sake of brevity.

With reference to FIG. 12, a suitable operating environment 1200 for implementing various aspects of this disclosure can also include a computer 1212. The computer 1212 can also include a processing unit 1214, a system memory 1216, and a system bus 1218. The system bus 1218 couples system components including, but not limited to, the system memory 1216 to the processing unit 1214. The processing unit 1214 can be any of various available processors. Dual microprocessors and other multiprocessor architectures also can be employed as the processing unit 1214. The system bus 1218 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1294), and Small Computer Systems Interface (SCSI). The system memory 1216 can also include volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1220 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1212 can also include removable/non-removable, volatile/non-volatile computer storage media. FIG. 12 illustrates, for example, a disk storage 1224. Disk storage 1224 can also include, but is not limited to, devices like a magnetic disk drive, floppy disk drive, tape drive, Jaz drive, Zip drive, LS-100 drive, flash memory card, or memory stick. The disk storage 1224 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1224 to the system bus 1218, a removable or non-removable interface is typically used, such as interface 1226. FIG. 12 also depicts software that acts as an intermediary between users and the basic computer resources described in the suitable operating environment 1201. Such software can also include, for example, an operating system 1228. Operating system 1228, which can be stored on disk storage 1224, acts to control and allocate resources of the computer 1212. System applications 1230 take advantage of the management of resources by operating system 1228 through program modules 1232 and program data 1234, e.g., stored either in system memory 1216 or on disk storage 1224. It is to be appreciated that this disclosure can be implemented with various operating systems or combinations of operating systems. A user enters commands or information into the computer 1212 through input device (s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device (s) 1240 use some of the same type of ports as input device(s) 1236. Thus, for example, a USB port can be used to provide input to computer 1212, and to output information from computer 1212 to an output device 1240. Output adapter 1242 is provided to illustrate that there are some output devices 1240 like monitors, speakers, and printers, among other output devices 1240, which require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a computer, a server, a router, a network PC, a workstation, a microprocessor based appliance, a peer device or other common network node and the like, and typically can also include many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1250 refers to the hardware/software employed to connect the network interface 1248 to the system bus 1218. While communication connection 1250 is shown for illustrative clarity inside computer 1212, it can also be external to computer 1212. The hardware/software for connection to the network interface 1248 can also include, for exemplary purposes only, internal and external technologies such as, modems including regular telephone grade modems, cable modems and DSL modems, ISDN adapters, and Ethernet cards.

Embodiments of the present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of various aspects of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to customize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a server computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:
1. A system, comprising:
 a memory that stores computer executable components; and
 a processor that executes the computer executable components stored in the memory, wherein the computer executable components comprise:
  a cooling system design component that receives first input specifying a cooling system design comprising a plurality of part objects, wherein adjacent part objects in a flow direction are connected at inlet-outlet junctions;

a system solver component that:
  determines respective sets of steady state values for parameters at the inlet-outlet junctions using a two-phase cooling system model, and
  determines a coefficient of performance of the cooling system design; and
a part recommendation component that generates a recommendation for an alternate part object for a part object of the plurality of part objects, wherein the alternate part object improves the coefficient of performance; and
the system solver component depicts the recommendation for the alternate part object in a graphical display.

2. The system of claim 1, wherein system solver component generates the graphical display that further depicts the respective sets of parameter values at the inlet-outlet junctions.

3. The system of claim 1, further comprising a part specification component that receives second input specifying at least one part object of the plurality of part objects.

4. The system of claim 1, wherein part objects of the plurality of part objects comprise respective part models, wherein the part models process a set of input values for the parameters and generate a set of output values for the parameters.

5. The system of claim 4, wherein the system solver component generates the two-phase cooling system model by ordering the part models in an order of associated part objects of the plurality of part objects in the flow direction, and wherein respective sets of output values for the parameters from the part models are employed as respective sets of input values for the parameters for adjacent part models in the flow direction.

6. The system of claim 5, wherein the system solver component:
  selects a set of initial input values for the parameters for a first part model of the part models;
  employs the part models to generate the respective sets of output values for the parameters for the part models; and
  determines whether a set of output values for the parameters from a second part model immediately prior to the first part model in the order of the flow direction are within respective thresholds of the set of initial input values for the parameters for the first part model.

7. The system of claim 6, wherein the system solver component, in response to a determination that the set of output values for the parameters from the second part model are within the respective thresholds of the set of initial input values for the first part model, uses the respective sets of output values for the parameters for the part models as the respective sets of steady state values for the parameters at the inlet-outlet junctions.

8. The system of claim 6, wherein the system solver component, in response to a determination that the set of output values for the parameters from the second part model are within the respective thresholds of the set of initial input values for the first part model, and iteratively until the set of output values for the parameters from the second part model are within the respective thresholds of the set of initial input values for the first part model:
  sets the set of output values for the parameters from the second part model as the set of initial input values for the parameters for the first part model, and
  employs the part models to generate the respective sets of output values for the parameters for the part models.

9. The system of claim 1, wherein at least one of processing time or accuracy associated with cooling system design are improved.

10. A computer-implemented method, comprising:
  determining, by a system operatively coupled to a processor, respective sets of steady state values for parameters at inlet-outlet junctions using a system model, wherein the determining is based on first user input specifying a cooling system design comprising a plurality of part objects, wherein adjacent part objects in a flow direction are connected at the inlet-outlet junctions;
  determining, by the system, a coefficient of performance of the cooling system design;
  generating, by the system, a recommendation for an alternate part object for a part object of the plurality of part objects, wherein the alternate part object improves the coefficient of performance; and
  generating, by the system, a graphical display that depicts the recommendation for the alternate part.

11. The computer-implemented method of claim 10, wherein part objects of the plurality of part objects comprise respective part models, wherein the part models process a set of input values for the parameters and generate a set of output values for the parameters, and the system model comprises the part models ordered in an order of associated part objects of the plurality of part objects in the flow direction, and respective sets of output values for the parameters from the part models are employed as respective sets of input values for the parameters for adjacent part models in the flow direction.

12. The computer-implemented method of claim 11, further comprising:
  selecting, by the system, a set of initial input values for the parameters for a first part model of the part models;
  employing, by the system, the part models to generate the respective sets of output values for the parameters for the part models;
  iteratively until a first determination that the set of output values for the parameters from a second part model are within respective thresholds of the set of initial input values for the first part model:
    setting, by the system, the set of output values for the parameters from the second part model as the set of initial input values for the first part model; and
    employing, by the system, the part models to generate the respective sets of output values for the parameters for the part models; and
  in response to a second determination that the set of output values for the parameters from the second part model are within the respective thresholds of the set of initial input values for the first part model:
    employing, by the system, the respective sets of output values for the parameters for the part models as the respective sets of steady state values for the parameters at the inlet-outlet junctions.

13. The computer-implemented method of claim 10, wherein at least one of processing time or usage of storage resources associated with cooling system design are improved.

14. The computer-implemented method of claim 13, further comprising:
  depicting, by the system, the respective sets of parameter values at the inlet-outlet junctions in the graphical display.

15. A computer program product for cooling system design modeling, the computer program product comprising a computer readable storage medium having program instructions embodied therewith, the program instructions executable by a processing component to cause the processing component to:

receive first user input specifying a cooling system design comprising a plurality of part objects, wherein adjacent part objects in a flow direction are connected at inlet-outlet junctions;

determine respective sets of steady state values for parameters at the inlet-outlet junctions using a system model;

determine a coefficient of performance of the cooling system design;

generate a recommendation for an alternate part object for a part object of the plurality of part objects, wherein the alternate part object improves the coefficient of performance; and generate a graphical display that depicts the recommendation for the alternate part.

16. The computer program product of claim 15, wherein part objects of the plurality of part objects comprise respective part models, wherein the respective part models process a set of input values for the parameters and generate a set of output values for the parameters, the system model comprises the part models ordered in an order of associated part objects of the plurality of part objects in the flow direction, and respective sets of output values for the parameters from the part models are employed as respective sets of input values for the parameters for adjacent part models in the flow direction.

17. The computer program product of claim 16, wherein the program instructions executable by the processing component further cause the processing component to:

select a set of initial input values for the parameters for a first part model of the part models;

employ the part models to generate the respective sets of output values for the parameters for the part models;

iteratively until a first determination that the set of output values for the parameters from a second part model are within respective thresholds of the set of initial input values for the first part model:

set the set of output values for the parameters from the second part model as the set of initial input values for the first part model, and employ the part models to generate the respective sets of output values for the parameters for the part models; and in response to a second determination that the set of output values for the parameters from the second part model are within the respective thresholds of the set of initial input values for the first part model, employ the respective sets of output values for the parameters for the part models as the respective sets of steady state values for the parameters at the inlet-outlet junctions.

18. The computer program product of claim 15, wherein at least one of processing time or usage of storage resources associated with cooling system design are improved.

19. The computer program product of claim 18, wherein the program instructions executable by the processing component further cause the processing component to:

depict the respective sets of parameter values at the inlet-outlet junctions in a graphical display.

20. The computer program product of claim 18, wherein the program instructions executable by the processing component further cause the processing component to:

receive second user input specifying at least one part object of the plurality of part objects.

\* \* \* \* \*